United States Patent [19]
Corrigan et al.

[11] Patent Number: 5,966,636
[45] Date of Patent: Oct. 12, 1999

[54] METHOD AND APPARATUS FOR MULTIPLE ACCESS OVER RANDOMIZED SLOTS WITH COLLISION DETECTION IN A CABLE TELEPHONY SYSTEM

[75] Inventors: Richard Corrigan, LaGrange; Bruce D. Mueller, Palatine; Timothy M. Burke, Algonquin, all of Ill.

[73] Assignee: Motorola, Inc., Schaumburg, Ill.

[21] Appl. No.: 08/564,837

[22] Filed: Nov. 29, 1995

[51] Int. Cl.⁶ ................................................ H04N 7/16
[52] U.S. Cl. ......................... 455/4.2; 348/10; 348/12; 348/13
[58] Field of Search .................. 455/4.1, 4.2, 5.1, 455/6.2, 6.3; 348/13, 12, 9, 4

[56] References Cited

U.S. PATENT DOCUMENTS

| | | | |
|---|---|---|---|
| 5,343,240 | 8/1994 | Yu | 455/6.2 |
| 5,517,502 | 5/1996 | Bestler et al. | 455/6.2 |
| 5,574,495 | 11/1996 | Caporizzo | 348/13 |
| 5,594,726 | 1/1997 | Thompson et al. | 455/4.2 |
| 5,606,725 | 2/1997 | Hart | 455/5.1 |

OTHER PUBLICATIONS

Generic Criteria for Version 0.1 Wireless Access Communications Systems (WACS) published by Bellcore, 1993 (TR–INS–001313), specifically Sections 6.4.5. and 6.5.2.

Personal Access Communications System Air Interface Standard J–STD–014 (PACS) published by Technical Ad Hoc Group 3 of the T1/TIA Joint Technical Committee, specifically Sections 6.4.5. and 6.5.2.

*Primary Examiner*—Anand S. Rao
*Attorney, Agent, or Firm*—Hugh C. Dunlop

[57] ABSTRACT

A method and apparatus in a communications system (100) for providing communications units (134) access to the communications system (100). The communications. system (100) includes a cable distribution network (106) with an base communications unit (102) and a number of downstream communications units (134) all connected to the cable distribution network (106). A plurality of channels are used to transmit data between the base communications unit (102) and the downstream communications units (134). A first set of channels are used primarily for access the communications system (100) and a second set of channels are used for transmitting data within the communications system (100) after access to the communications system (100) has been gained. The base communications unit (102) sends a first type of data transmission including an identification of access channels used for requesting access to the communications system (100). The base communications unit (102) assigns channels within the second set of channels response to receiving a request for access to the communications system (100) on the first set of channels. A mechanism also is provided for handling collisions in transmissions between the downstream communications units (134) to the base communications unit (102) in attempting to gain access to the communications system (100).

30 Claims, 16 Drawing Sheets

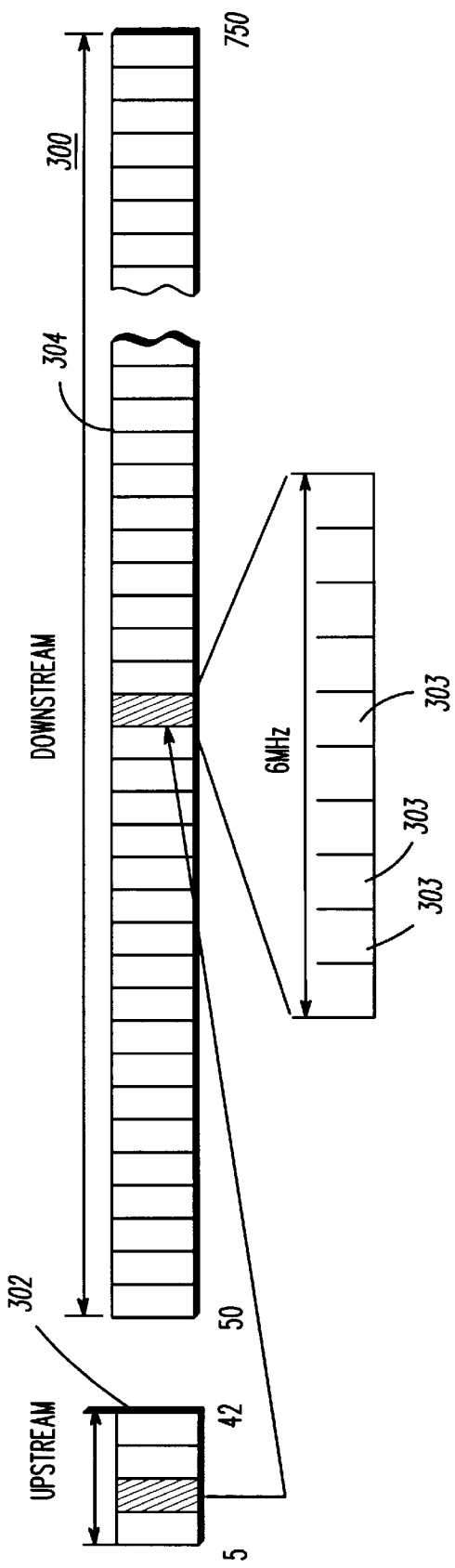
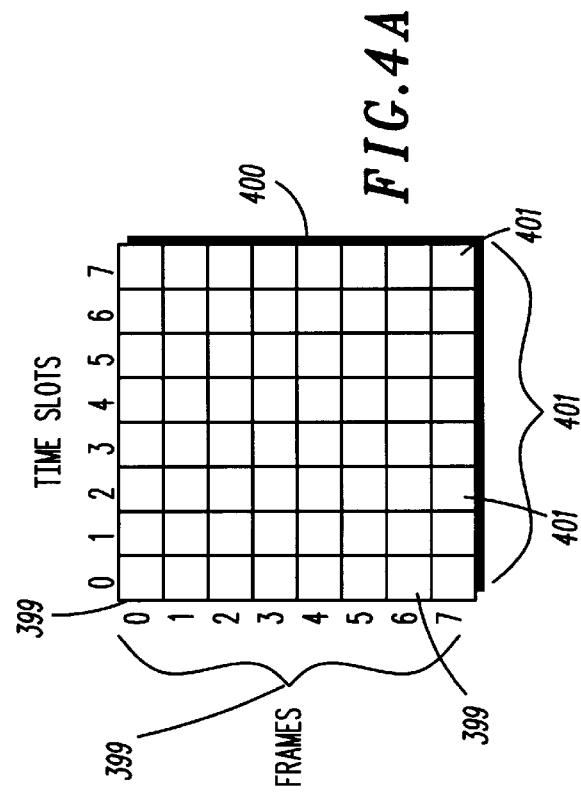

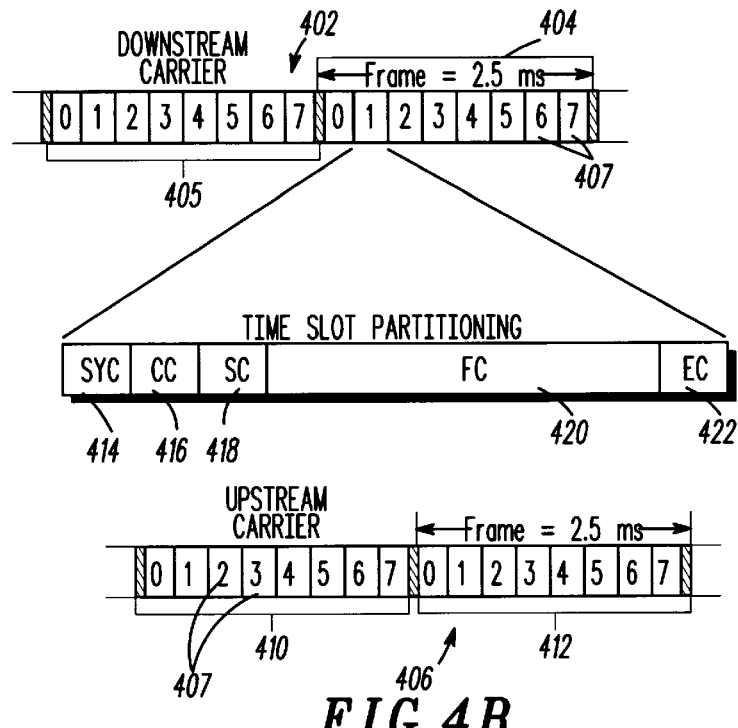

SYNCHRONIZATION PATTERN

| BITS | | | | | | | | SUB OCTET |
|---|---|---|---|---|---|---|---|---|
| 8 | 7 | 6 | 5 | 4 | 3 | 2 | 1 | |
| 1 | 1 | 1 | 1 | 1 | 0 | 0 | 0 | 1 |
| 1 | 1 | 0 | 0 | 1 | 0 | 1 | 0 | 2 |
| 0 | 0 | 0 | 0 | 0 | 1 | 0 | 1 | 3 |

TIME ALIGMENT RESPONSE

| BITS | | | | | | | | FC OCTET |
|---|---|---|---|---|---|---|---|---|
| 8 | 7 | 6 | 5 | 4 | 3 | 2 | 1 | |
| 1 | 1 | 0 | 0 | 0 | 1 | 0 | 1 | 1 |
| ACCESS REQUEST NUMBER (ARN) | | | | | | | | 2 |
| | | | | | | | | 3 |
| | | | | | | | | 4 |
| TIME ALIGMENT VALUE | | | | | | | | 5 |
| PCI | POWER ADJUSTMENT VALUE | | | | | | | 6 |

INITIAL ACCESS REQUEST, FAST CHANNEL

| BITS | | | | | | | | FC OCTET |
|---|---|---|---|---|---|---|---|---|
| 8 | 7 | 6 | 5 | 4 | 3 | 2 | 1 | |
| 0 | 0 | 1 | 1 | 1 | 0 | 0 | 1 | 1 |
| ACCESS REQUEST NUMBER (ARN) | | | | | | | | 2 |
| | | | | | | | | 3 |
| | | | | | | | | 4 |
| MAXIMUM BANDWIDTH RATE | | | | MINIMUM BANDWIDTH RATE | | | | 5 |

INITIAL ACCESS REQUEST, SLOW CHANNEL

| BITS | | | | | | | | SC OCTET |
|---|---|---|---|---|---|---|---|---|
| 8 | 7 | 6 | 5 | 4 | 3 | 2 | 1 | |
| 0 | 1 | | | | | | | 1 |
| ACCESS REQUEST RATE | | | | ARN | | | 0 | 2 |
| RESERVED | | | | | | | | 3 |
| | | | | | | | | 4 |

RECONNECT ACCESS REQUEST

| BITS | | | | | | | | FC OCTET |
|---|---|---|---|---|---|---|---|---|
| 8 | 7 | 6 | 5 | 4 | 3 | 2 | 1 | |
| 1 | 1 | 0 | 0 | 0 | 0 | 1 | 0 | 1 |
| ACCESS REQUEST NUMBER (ARN) | | | | | | | | 2 |
| | | | | | | | | 3 |
| | | | | | | | | 4 |
| RES. | UPLINK CARRIER ID | | | | | | | 5 |
| RES. | DOWNLINK CARRIER ID | | | | | | | 6 |
| FLAG | TIME SLOT A | | | BANDWIDTH A | | | | 7 |
| FLAG | TIME SLOT B | | | BANDWIDTH B | | | | 8 |
| FLAG | TIME SLOT C | | | BANDWIDTH C | | | | 9 |
| FLAG | TIME SLOT D | | | BANDWIDTH D | | | | 10 |
| FLAG | TIME SLOT E | | | BANDWIDTH E | | | | 11 |
| FLAG | TIME SLOT F | | | BANDWIDTH F | | | | 12 |
| FLAG | TIME SLOT G | | | BANDWIDTH G | | | | 13 |
| FLAG | TIME SLOT H | | | BANDWIDTH H | | | | 14 |

*FIG. 5G*

ACCESS CONFIRM RESPONSE, FAST CHANNEL

| BITS | | | | | | | | FC OCTET |
|---|---|---|---|---|---|---|---|---|
| 8 | 7 | 6 | 5 | 4 | 3 | 2 | 1 | |
| 1 | 1 | 0 | 0 | 0 | 1 | 1 | 0 | 1 |
| ACCESS REQUEST NUMBER (ARN) | | | | | | | | 2 |
| | | | | | | | | 3 |
| | | | | | | | | 4 |
| RES. | UPLINK CARRIER ID | | | | | | | 5 |
| RES. | DOWNLINK CARRIER ID | | | | | | | 6 |
| FLAG | TIME SLOT | | | BANDWIDTH | | | | 7 |
| (CONTINUE AS NEEDED) | | | | | | | | UP TO |
| FLAG | TIME SLOT | | | BANDWIDTH | | | | 14 |

*FIG. 5H*

ACCESS CONFIRM RESPONSE, SLOW CHANNEL

| BITS | | | | | | | | SC OCTET |
|---|---|---|---|---|---|---|---|---|
| 8 | 7 | 6 | 5 | 4 | 3 | 2 | 1 | |
| 0 | 1 | | | | | | | 5 |
| BANDWIDTH | | | | 0 | 0 | 1 | 1 | 6 |
| | ARN | | | TIME SLOT | | | | 7 |
| RESERVED | | | | | | | | 8 |

ACCESS DENY REPONSE, FAST CHANNEL

| BITS | | | | | | | | OCTET |
|---|---|---|---|---|---|---|---|---|
| 8 | 7 | 6 | 5 | 4 | 3 | 2 | 1 | |
| 1 | 1 | 1 | 0 | 1 | 1 | 1 | 1 | 1 |
| ACCESS REQUEST NUMBER (ARN) | | | | | | | | 2 |
| | | | | | | | | 3 |
| | | | | | | | | 4 |
| CAUSE | | | | | | | | 5 |

ACCESS DENY REPONSE, SLOW CHANNEL

| BITS | | | | | | | | SC OCTET |
|---|---|---|---|---|---|---|---|---|
| 8 | 7 | 6 | 5 | 4 | 3 | 2 | 1 | |
| 0 | 1 | | | | | | | 3 |
| 1 | 1 | 1 | 0 | 1 | 1 | 1 | 1 | 4 |
| RESERVED | | | | ARN | | | | 5 |
| CAUSE VALUE | | | | | | | | 6 |

METHOD AND APPARATUS FOR MULTIPLE ACCESS OVER RANDOMIZED SLOTS WITH COLLISION DETECTION IN A CABLE TELEPHONY SYSTEM

BACKGROUND

The present invention relates generally to a communications system and in particular, to a method and apparatus for multiple cable access units accessing a cable telephony communications system.

In a cable telephony communications system, frequency division multiplexing (FDM) is employed. FDM allows two or more simultaneous continuous channels to be derived from a transmission medium by assigning separate portions of the available frequency spectrum, separated by some minimal channel spacing within a block of spectrum, to each of the individual channels. FDM provides for a fixed number of physical channels (i.e. separate frequencies) in a cable telephony communications system. To provide more channels to increase the number of users that may operate on a cable telephony communications system, time division multiplexing (TDM) is used. TDM provides time division multiple access (TDMA) in which users share a carrier frequency in the communications system by being assigned and using one at a time, for a limited amount of time, time division multiplex channels (time slots). In effect, each user gets assigned a different time slot on the same frequency. In this way many users can share the same frequency. Data transmissions are sent in time slots in which a communications unit may be assigned a particular time slot only for a limited amount of time.

One of the challenges of a TDMA system is providing to the users access on demand of the TDMA channels. A related challenge is resolving collisions when two or more users try to access or use the same TDMA channel. Consequently, it is desirable to have a system that elegantly provides access on demand of the TDMA channels, and elegantly resolves collisions when multiple users attempt to use the same channel.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an illustration of spectrum allocations for a communications system according to the present invention;

FIG. 4A is a diagram of a superframe used according to the present invention;

FIG. 4B is an illustration of a downstream channel and an upstream channel;

FIGS. 5A–5K are illustrations of different types of information bursts which are employed in providing CAUs access to a communications system according to the present invention;

DETAILED DESCRIPTION OF THE DRAWINGS

The preferred implementation of the present invention allows multiple users of a telephone-over-cable system to access TDMA channels (which carry the calls) on demand. Also, this implementation elegantly and efficiently resolves collisions when two users try to access the same channel. The implementation is somewhat related to two air interface communications protocols, described respectively in Generic Criteria for Version 0.1 Wireless Access Communications Systems (WACS) published by Bellcore, 1993 (TR-INS-001313) and Personal Access Communications System Air Interface Standard J-STD-014 (PACS) published by Technical Ad Hoc Group 3 of the T1/TIA Joint Technical Committee, which documents are incorporated in this description by this reference.

The following description begins with an overview of the cable telephony system. It then describes the electronics in the portion of the system that is at the cable companies' headquarters ("headend"), and then the electronics in the portion of the equipment that is at the subscriber's home or business.

This description then explains how the frequency spectrum that is available on the cable is used by the cable telephony system. Subsequently, this description discusses how the frequencies used by the system are divided into time slots, and how those time slots are structured with respect to the digital messages that they carry. Then, specific message formats are described for some of the particular digital messages sent back and forth in the system to facilitate channel access and collision resolution.

Next, state diagrams are discussed, illustrating the process that the user's equipment goes through, and that the headend equipment goes through, in setting a user up with a TDMA channel. Subsequently, flow diagrams are shown illustrating the related processes. Finally, examples are shown and discuss of particular signaling scenarios which take place in providing the user access to a channel, and in resolving collisions between users attempting to access the same channel.

I. Overview of the Cable Telephony System

Figure 1:
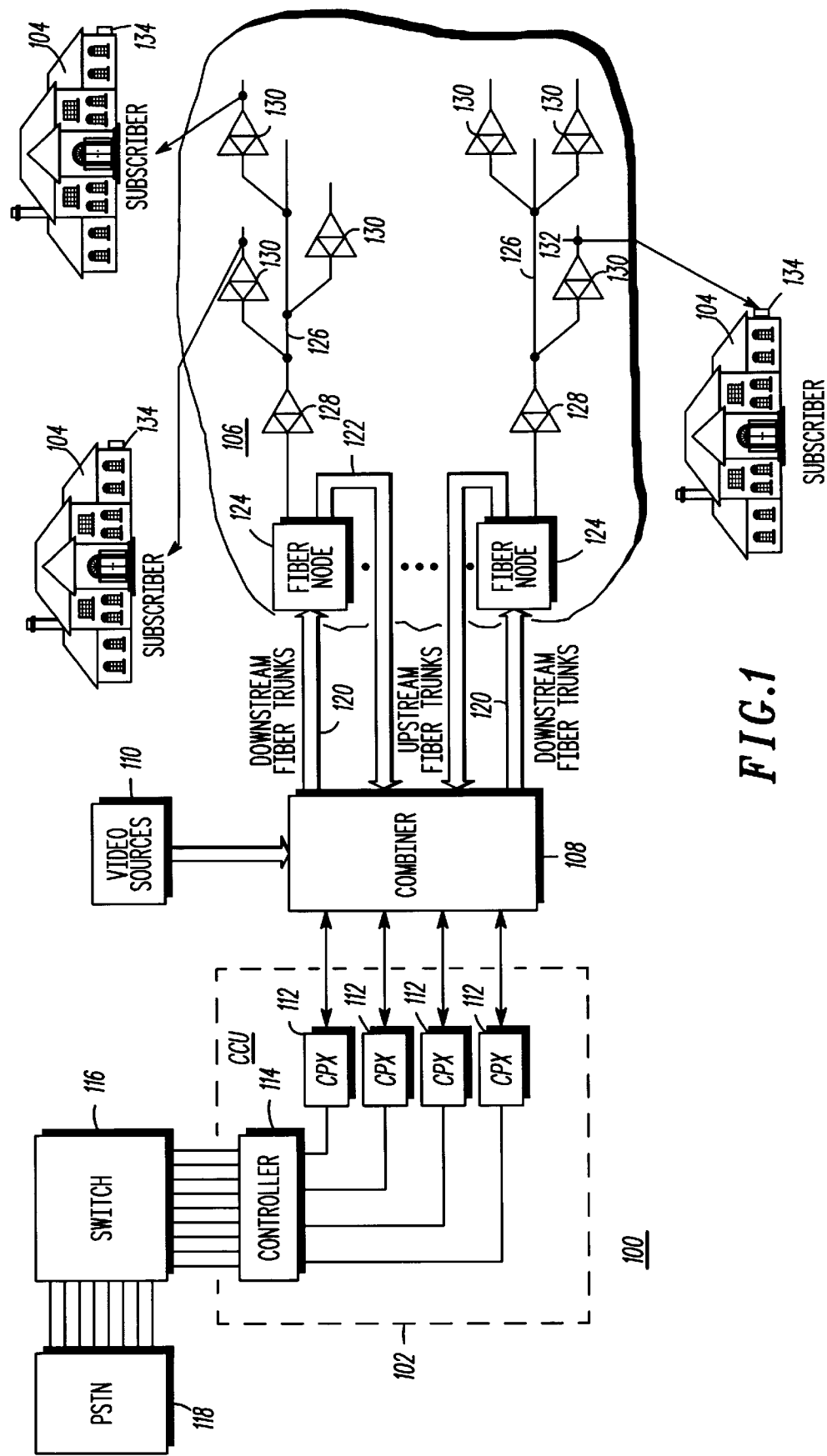
FIG. 1 is a diagram of a communications system in which the present invention may be implemented.

With reference now to the FIGs., and in particular with reference to FIG. 1, a diagram of a communications system is illustrated in which the present invention may be implemented. Communications system 100 is an example of a basic cable system architecture that is a hybrid fiber/coaxial cable (HFC) system using a combination of fiber and coaxial cable to distribute subscriber services to customer premises equipment. Alternatively, communications system 100 may consist entirely of coaxial cable, fiber, or other suitable communications medium. Regardless of the cable infrastructure, a cable branch will serve a distribution area shared by a community of subscribers. In the depicted example, communications system 100 is a cable telephony communications system that provides telephone services along with cable television services on an HFC television infrastructure.

Communications system 100 includes a cable control unit (CCU) 102 or some other base communications unit that is connected to subscribers 104 by a distribution network 106 and a combiner 108. The CCU is a portion of the equipment at the cable company headend that sends and receives telephone calls to and from the home subscribers. Combiner 108 also has an input for video sources 110. CCU 102 also includes cable port transceivers (CPXs) 112, which are connected to combiner 108. These cable port transceivers generate downstream carrier channels in communications system 100. "Downstream" or "downlink" as used in this description refers to radio frequency (RF) signals going to the subscriber homes. "Upstream" or "uplink" as used in this description refers to RF signals going from the subscriber to the headend.

Combiner 108 receives modulated RF carriers from video sources 110 and from CPXs 112 in CCU 102 and sums these signals together to be sent over distribution network 106. CPXs 112 are controlled by a controller 114 which provides all functions necessary to support the data link portion of the system. The "Data link portion" refers to the ability for the system to carry phone calls in the form of digital data, as well as any other communications in the form of digital data. The headend of the communications system typically includes CCU 102, combiner 108, and video sources 110. Digital switch 116 may be in a remote location from the headend or may be located at the headend itself. These components are the headend equipment responsible for providing access and management of services to the cable system 100 servicing multiple subscribers. Controller 119 in CCU 102 is connected to switch 116 through digital carrier facilities, such as T1 or E1, which is in turn connected to a public switching telephone network (PSTN) 118. Switch 116 may be, for example, a class 5 TELCO switch.

Transmissions from CCU 102 in distribution network 106 are facilitated by downstream fiber trunks 120 and upstream fiber trunks 122. These fiber trunks are fiber optic cables and are connected to fiber nodes 124. Fiber nodes 124 perform directional conversion between the optical domain of fiber optical cable and the electrical domain of coaxial cable in distribution network 106. Each fiber node 124 has a connection to at least one serving area 126. In the depicted example, serving area 126 comprises coaxial cable and includes trunk amplifiers 128, which are bidirectional amplifiers in the depicted example. Additionally, bidirectional line extenders 130 are located near taps 132, which are connected to cable access units (CAUs) 134 located at subscriber 104. These CAUs are also called "subscriber communications units".

CCU 102 is used to provide telephony (as well as other digital data communications) in communications system 100. Additionally, CCU 102 controls the cable spectrum, infrastructure resources, and services for all CAUs on a serving area, as well as managing multiple serving areas. CAUs 134 provide telephone and television services at subscriber premises. Typically, a CAU is mounted on the side of the subscriber's home, or on an unintrusive place, such as a basement or attic. The CAU manages the uplink and downlink communications paths and transports cable television channels to the subscriber's television. For example, "A plane old telephone" (POTS) at the subscriber's home plugs into the CAU. The CAU puts the phone signals from the POTS on to the cable system. Additionally, the CAU takes phone calls off the cable system and forwards them to the POTS, as well as taking regular cable TV signals off the cable and passing them along to the subscriber's TV.

II. Overview of Electronics in CCU and CAU

Figure 2A:
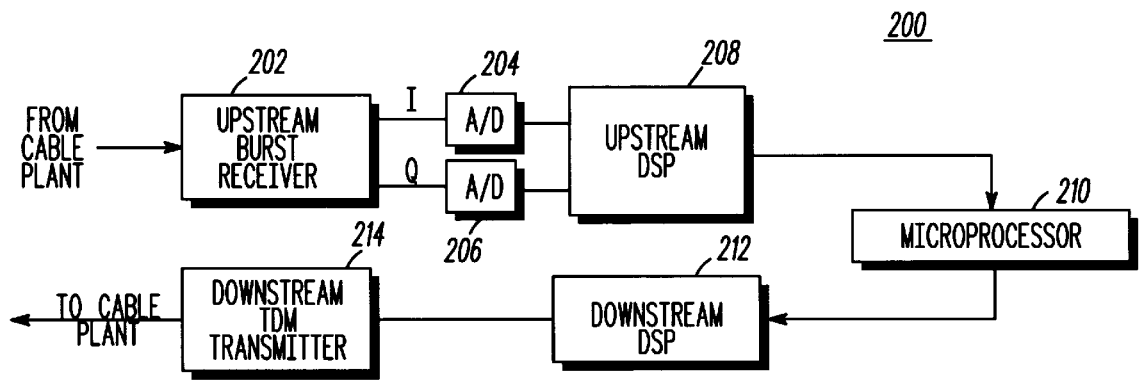
FIG. 2A is a block diagram of components in a cable control unit (CCU) according to the present invention.

Turning next to FIG. 2A, a block diagram of components in a CCU control unit is depicted according to the present invention. In CCU 200, upstream burst receiver 202 receives a TDMA burst from a CAU and down converts the burst to baseband quadrature I and Q signals. A "burst" is a fixed transmission of data in bits bearing information. The burst is π/4—DQPSK modulated. These baseband I and Q signals are converted to a digital signal by analog to digital (A/D) converters 204 and 206 and processed by upstream digital signal processor (DSP) 208. In the depicted example, A/D converters 204 and 206 are 8-bit A/D converters. Upstream DSP 208 sends the processed information to microprocessor 210.

Microprocessor 210 sends messages back to the CAU through downstream DSP 212 and downstream TDM transmitter 214, which is connected to the communications network on which the CAU is located.

Upstream burst receiver 202, A/D converters 204 and 206, upstream DSP 208, microprocessor 210, downstream DSP 212, and downstream transmitter 214 are components found in CPXs 112 in FIG. 1. The downstream components depicted in FIG. 2A may be in the same transceiver or a different transceiver (CPX) from the upstream components illustrated. Upstream DSP 208, microprocessor 210, and downstream DSP 212 make up a processing unit in FIG. 2A. Microprocessor 210 is found in controller 114 in FIG. 1. This microprocessor and the DSPs in CPXs 112 form the processing unit in CCU 102.

Figure 2B:
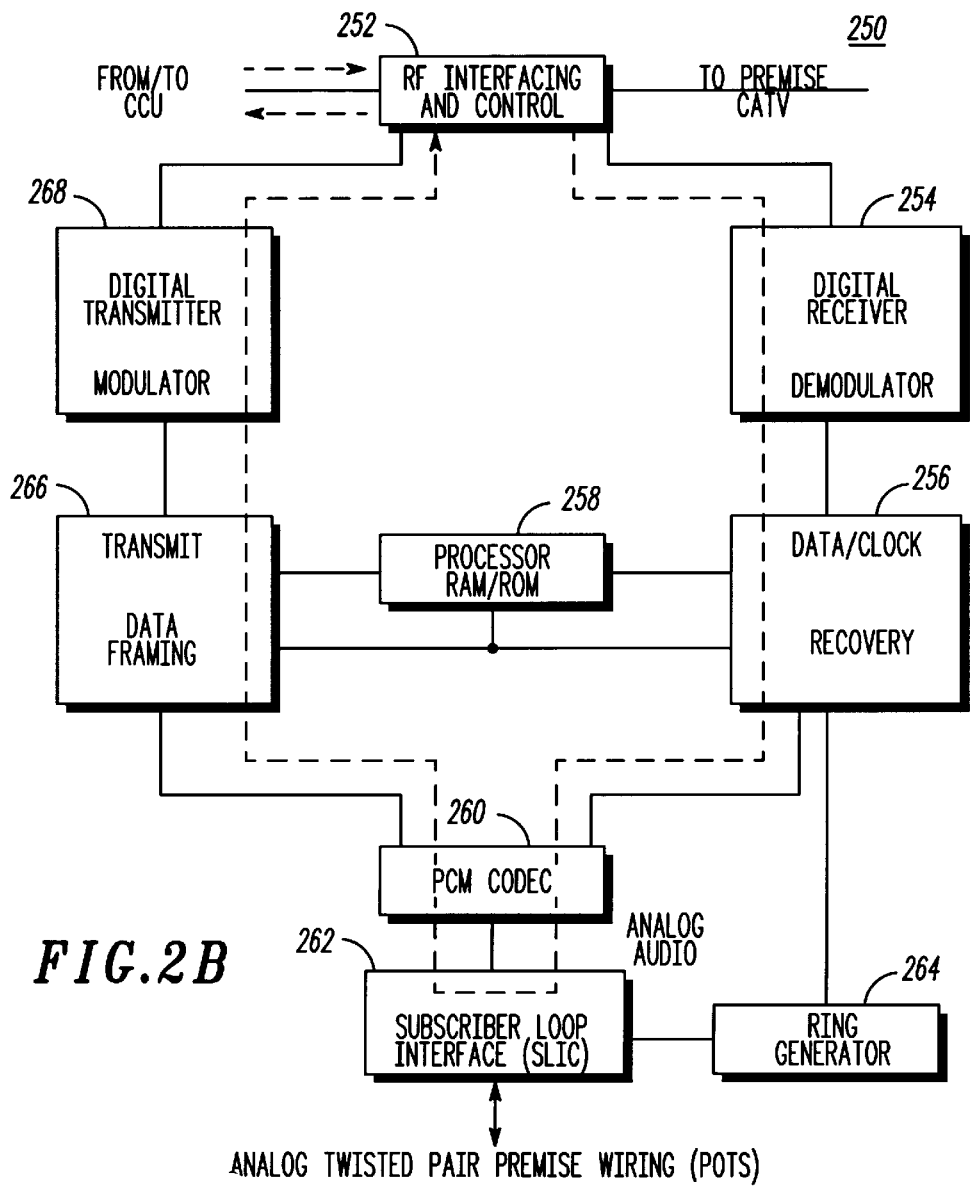
FIG. 2B is a block diagram of components in a cable access unit (CAU) according to the present invention.

With reference now to FIG. 2B, a blocked diagram of components in a cable access unit (CAU) is depicted according to the present invention. CAU 250 is connected to a hybrid coaxial cable in distribution network 106 in FIG. 1 by RF interfacing and control 252. This interface and control unit provides a 75 ohm interface to the hybrid coaxial cable. RF interfacing and control 252 also provides a connection to cable television equipment on the subscriber premises. Additionally, RF interfacing and control 252 includes a control switch to turn on or off signals to premise cable television systems at the subscriber premises. Data received from the CCU at RF interfacing and control 252 are sent to digital receiver (demodulator) 254. The signals received from the CCU are in a frequency range from about 50 MHz to 750 MHz and converted to a low intermediate frequency (IF) by digital receiver 254. From this form, digital receiver 254 translates the low frequency IF to a baseband π/4 DPQSK modulated signal. Next the signal is demodulated to obtain bits from the signal. Thereafter, data/clock recovery 256 takes the bits from digital receiver 254 and separates the bits to send to processing unit 258 or pulse code modulated (PCM) coder/decoder (codec) 260. Control information is sent to processing unit 258 while user data is sent to PCM codec 260, which converts the user data into an analog form to be passed along to the subscriber's phone.

Processing unit 258 in the depicted example includes one or more microprocessors or digital signal processors (DSPs) along with random access memory (RAM) and read only memory (ROM). The RAM and ROM contain data and instructions coding for processes performed by the microprocessors or DSPs within processing unit 258. User information is converted by PCM codec 260 to an analog form and sent to subscriber loop interface (SLIC) 262. SLIC 262 provides basic telephony functions, such as indicating whether the phone is ringing or off hook, or whether loop closure has occurred. Additionally, SLIC 262 separates duplex signals into a send signal and a receive signal. SLIC 262 and the functions performed by it are well known to those who are skilled in the art. Ring generator 264 actually provides the voltage used to cause the telephone to ring.

User data from the subscriber premises (such as output from a phone or even output from a standard computer modem) are sent back through SLIC 262 to PCM codec 260, which transforms the data from an analog form to a digital form for processing by transmit data framing 266. Transmit data framing 266 takes raw speech data and puts this data into the frame for transmission to the CCU. For example, transmit data framing 266 includes the necessary synchronization information and calculates the cyclic redundancy code for error checking, which is placed into the slow channel of the frame (as described in more detail below). Transmit data framing 266 is controlled by processing unit 258 and sends signals upstream which are synchronized with the downstream signals. This synchronization in transmit data framing 266 is controlled by data/clock recovery 256. In other words, uplink and downlink transmissions to and from CAU 250 are synchronized. Finally, the data, as a burst, is transmitted by digital transmitter (modulator) 268 to RF interfacing and control 252 and back to the CCU.

III. RF Carrier Spacing, Time Slots in Carriers and Bit Structure of Individual Time Slots Data carried across distribution network 106 in FIG. 1 may include both voice and non-voice data, such as ISDN digital video, phone data, interactive video, or interactive multimedia services. In the present invention, the transport technology used for the cable telephony exchange service is trunked. In other words, a cable telephony traffic channel is not dedicated to one particular user, but is available to all users on the basis of a request for service. Such an arrangement is called multiple access or subscriber loop concentration.

Typically, once a particular channel is assigned to a subscriber, it is assigned for the duration of a call. When the call is revoked, the channel is made available for a subsequent service request. Consequently, it is possible for a CCU to serve many more subscribers than the channels available in a serving area. Additionally, the whole spectrum can be used over again in each service area that has its own physically isolated cablewire layout.

According to the present invention, the cable telephony communications system divides up the radio frequency (RF) spectrum for use with multiple subscribers such that no individual subscriber has a dedicated frequency range.

With reference to FIG. 3, an illustration of spectrum allocations for communications system 100 is depicted according to the present invention. As mentioned above, the spectrum allocated for service within a single serving area may be used again for a different group of subscribers in every serving area of distribution network 106. In the depicted example, RF spectrum 300 includes uplink spectrum 302 and downlink spectrum 304. In the depicted example, uplink spectrum 302 covers a range from 5 MHz to 42 MHz while downlink spectrum 306 covers a range from 50 MHz to 750 MHz. The spectrums are further subdivided into channels that are each 6 MHz in width. In the depicted example, downlink spectrum 306 includes 120 channels with each channel being 6 MHz in width. Although the depicted example shows an uplink spectrum of 5 to 42 MHz and a downlink spectrum 306 from 50 to 750 MHz with each channel having a width of 6 MHz, other spectrums and channel widths may be used according to the present invention.

Communications system 100 is divided up into areas with separate signal paths in which the RF spectrum allocated for the cable telephony service may be used again for a different group of subscribers in each separate area of the distribution network 106. In the downlink transmission, a large number of conventional television channels (for example 80 channels, each 6 MHz in width) are typically conveyed to cable television subscribers. The uplink spectrum (5–42 Mhz) can be used for any communications returning from the subscriber. A portion of the downlink spectrums, preferably one 6 MHz section as shown in FIG. 3, and an equal or larger portion in the uplink spectrum are dedicated to a plurality of trunked traffic channels serving a large number of subscribers having telephone and/or other two way service. Within these dedicated spectrum allocations, a number of RF carriers (exemplified by portions 303) are deployed. These RF carriers are spaced 600 KHz apart. Active carriers are operated in pairs with one in the uplink segment of the allocation associated with each one in the downlink segments. This association provides for frequency division duplex (FDD) operations. Nevertheless, the system is completely flexible in that any of the upstream channels can be matched with any of the downstream channels.

Accordingly, in the preferred embodiment of the invention, a 6 MHz portion (somewhere within 50–750 MHz) contains ten 600 KHz RF carriers 303 used for downstream communications. Similarly, a 6 MHz portion (somewhere within 5–42 MHz) contains ten 600 KHz RF carriers 303 used for upstream communications.

According to this described scheme, each RF carrier is time division multiplexed into eight sequential "frames". Each frame is further broken down into eight sequential "slots". Each of these slots is one time divisioned multiplexed "channel" available for use by a subscriber, upon demand.

FIG. 4A shows the above described scheme diagramatically. The figure represents one RF carrier. The carrier is divided into eight frames 399. Each frame is divided into eight time slots 401, which are each a channel. The whole box 400 shown, i.e. eight frames of eight slots, is sometimes referred to as a superframe.

FIG. 4B shows the scheme in a different way. FIG. 4B shows downstream carrier 402 and upstream carrier 406. More specifically, with reference to carrier 402, two consecutive frames 404 and 405 are shown. These are two of the eight frames 399 in FIG. 4A. Each of the frames is made up of eight consecutive time slots 407. Each of the time slots is available as a communications channel on the cable telephony system. As illustrated by FIG. 4B, upstream carrier 406 is configured in the same way as downstream carrier 402.

Each time slot is further partitioned for different types of signaling by by the CCU or CAU. For example, as shown in the figure time slot 1 in frame 404 includes a synchronization channel (SYC) 414, a control channel (CC) 416, a slow channel (SC) 418, a fast channel (FC) channel 420, and an error control channel (EC) 422. Sync channel 414 is a synchronization channel used for frame synchronization. CC 416 is used to indicate word errors, signaling, and power control. SC 418 is used for signaling, and FC 420 is used for both user data and signaling. EC 422 is used for error detection. In both the uplink and downlink bursts, SC 418 includes 26 bits, FC 420 includes 160 bits, and EC 422 contains 20 bits. CC 416 contains 2 bits in uplink bursts and 9 bits in downlink bursts. Particular digital messages which use these various portions of the time slot will be discussed in further detail below.

CCU channel 402 is a downlink channel transmitted in a frequency range from 50 MHz to 750 MHz while CAU channel 406 is an uplink channel transmitted in a range from 5 MHz to 42 MHz according to the present invention. A data transmission within these channels is sent as a "burst", which is a fixed length transmission of data, such as a transmission of a group of bits. In the depicted example, a burst is 224 bits per time slot in CAU channel 406 and 240 bits per time slot in CCU channel 402.

Each time slot in both the uplink and downlink may be used for different types of channels such as a system broadcast channel (SBC), a system access channel (SAC), or a traffic channel (TCH). Each of these different "channels" has a different functionality. The SBC and SAC may both be considered system access channels because of their function. SBCs broadcast system information in the downlink to all CAUs monitoring the SBCs. A downlink SBC carries system wide information, such as alerts used to "page" a CAU and system database information used for controlling and managing CAUs. A SBC is divided into two logical information streams that are time multiplexed onto the SBC. In particular, a system information channel (SIC) and an alerting channel (AC) are time multiplexed onto the SBC. A CAU locates the SBC and listens to the SIC for information of general interest to all devices attached to a CAU. According to the present invention, the SIC identifies general system identifiers and capabilities; security information used for authentication and encipherment; and location of carrier frequencies, SBCs, and SACs.

On the AC, messages are used to notify or "page" a CAU with information, such as an incoming call. These messages include alert identifiers. Each CAU is assigned an alert identifier and monitors the AC to determine whether a message on the AC is directed towards it. Multiple SBCs are used to provide redundancy in communications system.

A CAU uses a SAC to obtain a TCH assignment so that the CAU can place a call, or send other digital data. Additionally, the CAU listens to the AC of the SBC for notification of incoming calls.

The SAC is a physical channel conveying three logical channels, a time alignment channel (TAC), a request access channel (RAC), and a system request channel (SRC). The TAC carries shortened uplinked bursts (SUBs) in the uplink used for time alignment, and the RAC carries access requests in the uplink. The SRC carries responses to uplink messages from the CAU. SACs are employed to perform time alignment and request and/or assign TCHs. As a result, CAU will use a SAC for one of the following purposes: time alignment, initial request for a traffic channel, or reconnect to a traffic channel. Multiple SACs (i.e. multiple slots on the same or different carrier) are used to provide both redundancy and to reduce contention between multiple CAUs requesting access to the communications system. TCHs provide user services on the communications system and may be requested and assigned for varying rates. A TCH is divided into two types of sub channels: a user information channel (UIC) and a message channel (MC). The UIC carries user information, such as voice data or analog modem data. The MC carries signaling information between the CCU and the CAU. TCHs are either busy (in use) or idle (not in use). According to the present invention, the access channels (the SBCs and the SACs) and data channels (the TCHs) may be moved to different frequencies depending on the quality of the carrier transmissions. Changing the frequency of SACs results in the new frequencies being broadcast on the SBCs. Changes in frequencies of a TCH may be performed using an alternate link transfer (ALT) to allow a CAU to maintain a connection in spite of movement of the channel to another frequency. ALTs are known in radio communications but are historically used to maintain a call while a user moves geographically among cells in a cellular system.

V. Format and Content of Specific Messages

With reference to FIGS. 5A–5K, a number of bursts in the form of requests and responses employed in providing CAUs with access to a communications system are illustrated according to the present invention. Messages between communications units, such as CCUs and CAUs, contain access request numbers (ARNs) to identify to which CAU a particular message is directed. ARNs are unique to each CAU within a serving area. ARNs are employed to uniquely identify messages, such as requests and responses. All bursts or requests from a CAU include an ARN to identify the origination of the burst. Similarly, when responses are sent back to a CAU, the CAU can identify the response as being directed towards the CAU based on the ARN contained within the response from the CCU.

According to the present invention, an ARN, such as ARN 500 in FIG. 5A, is employed. ARN 500 is a 24 bit ARN and includes an alert value, an alert phase, and a random number. The alert phase indicates the period of time in a superframe that a CAU will monitor the SBC. The use of this alert phase allows a CAU to stay in a standby or sleep mode and activate its receiver only for a brief period of time. The CAU will remain in a sleep mode during most of a superframe and activate its receiver only during its alert phase, allowing for a reduction in power consumption. The alert value is a unique identifier assigned to a CAU and is unique within a particular alert phase. The alert phase and the alert value form an alert identifier that is unique within a serving area. A random number is included in ARN 500 to ensure that a CAU in a serving area will not generate the same ARN twice.

In some instances a 3 bit ARN is employed to identify messages between a CAU and a CCU. In particular, a 3 bit ARN is used when a CAU already has a TCH and sends and receives messages on the SC. A 3 bit ARN can be employed because, in the depicted example, a connection between the CCU and the CAU has been establish, meaning that no other CAUs will be using the channel. As a result, the CCU only needs to be able to distinguish between different requests that the CAU might make. The 3 bit value allows for 8 ARNs to be used by a CAU that can support multiple lines or TCHs.

In accessing a communications system, SAC messages are contained in a single burst to allow each SAC frame to be equally accessible by any CAU. Typically, messages on a SAC use the full time slot. Thus, misalignment of uplink bursts will cause collisions to occur with other uplink transmissions. Thus, initially, a shortened uplink burst (SUB) is used to determine if any changes in alignment of uplink bursts from the CAU are required. In FIG. 5B, SUB 502 has a length less than half of a time slot to avoid interference with adjacent time slots according to the present invention. The position of SUB 502 in the time slot is used by the CCU to determined what changes if any are needed to align bursts sent by the CAU within the time slots. In the depicted example, SUB 502 contains three synchronization patterns, such as synchronization pattern 504 (shown in FIG. 5C), a differential encoder (DE), and an ARN, such as ARN 500 in FIG. 5A. In FIG. 5B, the same synchronization pattern is repeated three times within the SUB to increase the chances of the CCU properly receiving and decoding the synchronization pattern. The DE is a two bit value that serves to indicate that a burst is arriving at the CCU and that decoding should begin.

Next, a time alignment response is a response sent by a CCU to a CAU in response to receiving a SUB to indicate if any changes in timing of uplink bursts are needed. With reference to FIG. 5D, time alignment response 506 contains a time alignment value indicating what change in the timing of transmission of uplink bursts is needed to align uplink bursts within the time slots. In particular this value indicates the change in the offset in time between receiving a downlink burst and transmitting an uplink burst. This response also contains a power control indicator (PCI) and a power adjustment value telling the CAU what transmit power level the CAU should use in transmitting bursts. The PCI tells the CAU whether to increase or decrease the power level of transmissions while the power adjustment value indicates the magnitude of the power level adjustment.

An initial access request, such as initial access request 508 in FIG. 5E, is sent by the CAU to the CCU on the RAC to initiate a system access request at the CCU. The initial access request 508 identifies the maximum bandwidth rate and minimum bandwidth rate that are desired and/or acceptable in a TCH that assigned to the CAU. According to the present invention these bandwidth rates in communications system 100 may be 8 kilobits per second (kbps), 16 kbps, 32 kbps, or 64 kbps. The initial access request also may include bit s for indicating a priority of the request and a delay value (not shown). The priority of the request may be used to provide different classes of services, such as voice, digital video, or ISDN. The delay time value indicates how long the CAU will wait for a channel assignment before taking some other action, such as sending another initial access request.

Further, a CAU already assigned a TCH using initial access request 508 can send an initial access request, such as initial access request 510 in FIG. 5F. This request is sent to the CCU on the slow channel. This initial access request on the slow channel is typically a request, from a CAU that can handle multiple connections, for a another TCH for a new connection when the CAU already has an ongoing connection. The access request rate in initial access request 508 is the desired bandwidth for the new TCH.

With reference to FIG. 5G, a reconnect access request is depicted according to the present invention. Reconnect access request 512 is a request sent by the CAU to the CCU to request another TCH due to a loss of synchronization with a TCH and is sent to the CCU on the RAC in an attempt to reconnect a call. A loss of synchronization can occur when the TCH is assigned and the CAU does not receive notification of the new carrier, or if the physical connection is cut. Reconnect access request 512 includes an uplink carrier ID and a downlink carrier ID specifying the original TCH used by the CAU. The flag bit s indicate whether time slot and bandwidth fields are associated with an active TCH. Multiple time slot and bandwidth fields are used in reconnect access request 512 to allow a CAU that can handle multiple TCHs to request a reconnection of all TCHs at the same time.

In response to requests from the CAU, the CCU sends a number of responses including an access confirm response, which is sent in response to a system access request from a CAU. FIG. 5H shows an access confirm response 514 that is sent from the CCU to the CAU on the SRC to assign a TCH to the CAU. Access confirm response 514 includes channel assignment information, such as the time slot and bandwidth associated with an assigned TCH. The time slot field tells the CAU which time slot to use while the bandwidth field tells the CAU which frames within a superframe to use for transmitting bursts, such as super frame 400 in FIG. 4A. For example, time slot 2 and a bandwidth of 64 kbps would tell the CAU to transmit in time slot 2 of every frame of superframe 400, while time slot 2 and a bandwidth of 32 kbps would tell the CAU to transmit in time slot 2 of every other frame within superframe 400. Flag bit s indicate whether useful information is found in the associated time slot and bandwidth fields. With an initial access request, only one time slot and bandwidth field will contain information for the CAU because only one TCH is assigned in response to an initial access response. When a request is made to reconnect, the other time slot and bandwidth fields are used when a CAU that can handle multiple TCHs requests a reconnection to more than one TCH.

An access confirm response also may be sent on the slow channel by the CCU to the CAU in response to an initial access request made by the CAU on the slow channel, as illustrated by access confirm response 516 in FIG. 5I. This type of access confirm response is sent to assign the CAU another traffic channel for a new connection. Access confirm response 516 contains an identification of the bandwidth and time slot of the new TCH assigned to the CAU.

With reference to FIG. 5J, an access deny response 518 is a message sent by the CCU to the CAU on the SRC to reject a system access request by a CAU. This response is sent to tell the CAU that a TCH will not be assigned to the CAU. On the slow channel, access deny response 520 in FIG. 5K is denying a CAU another TCH for a new connection. The access deny response includes a cause value, indicating the reason why access was denied. Reasons for denying access may include, for example, inadequate cable resources available, inadequate network resources available, reconnection not possible, or service denied for some unspecified reason.

VI. State Diagrams of CAU and CCU for Allocating a Channel to a CAU

Figure 6:
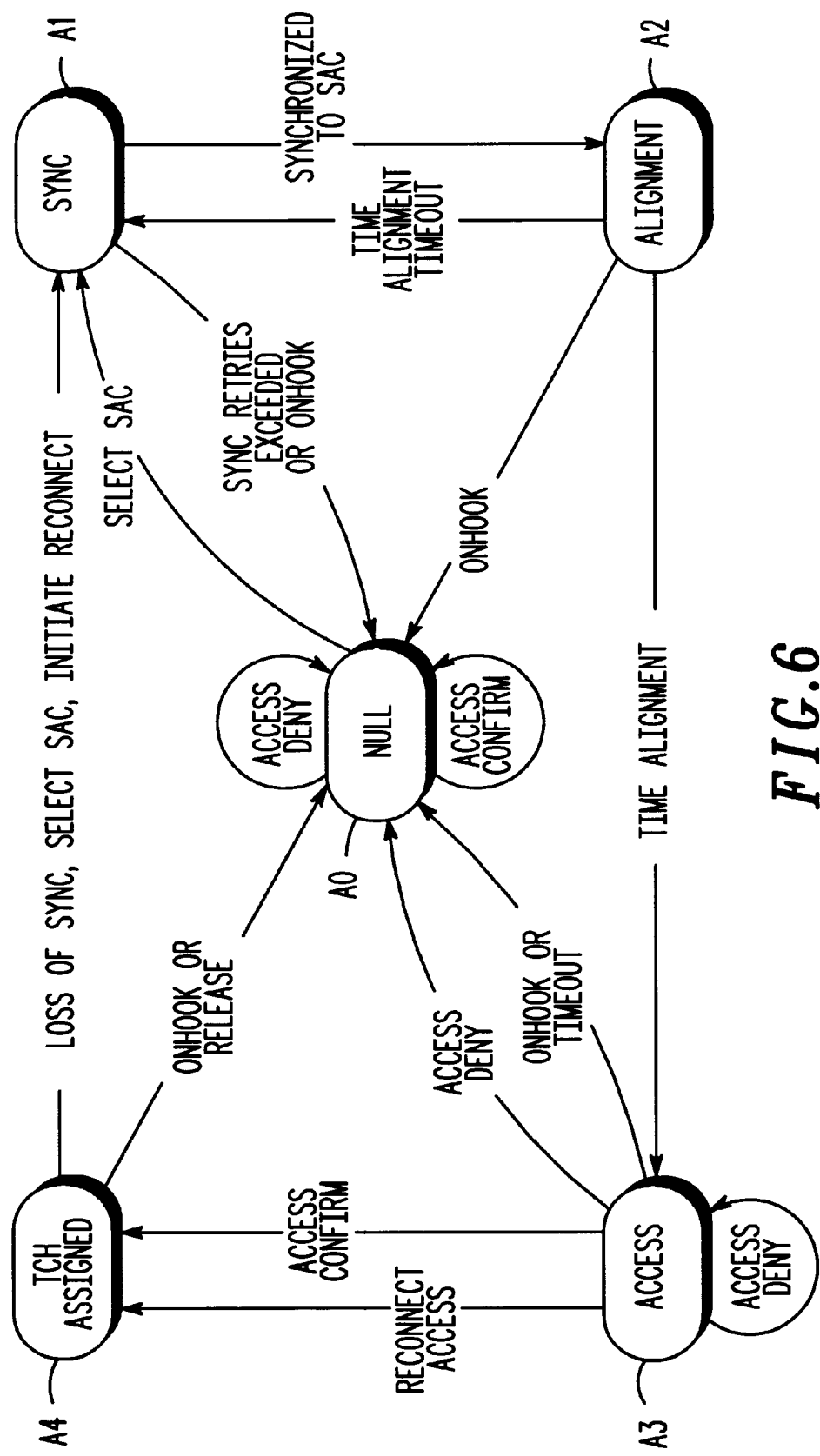
FIG. 6 is a state diagram of a CAU during system access procedures according to the present invention.

Turning now to FIG. 6, a CAU state diagram for system access procedures is depicted according to the present invention. State diagram 600 depicts different states of the CAU occurring while accessing communications system 100. The CAU begins at Null state A0. In this state, a SAC is randomly selected based on the number of SACs broadcast in the SIC. The CAU locates a selected SAC on the appropriate downlink carrier and moves to Sync state A1, which is the CAU SAC synchronization state. Any access confirm or access deny responses received in Null state A1 are ignored because the CAU is not listening to the SAC at that time. One of these responses would be received by a CAU if the user hangs up before the system sends an access confirm or access deny response. When the CAU detects the loop closure, the CAU goes back to monitoring the SBC, which means the CAU will not receive the SAC response from the CCU. As a result, a CCU must be capable of detecting a dead link, which is an assigned traffic channel where the CAU is not transmitting. In all the other states, if the CAU detects a loop closure from the telephone equipment at subscriber premises, the CAU will return to state A0 and continue monitoring the SBC.

In Sync state A1, the CAU continues to try to synchronize to the SAC for a period of time. If the CAU exceeds a selected number of retries, the CAU then transitions back to Null state A0, where the CAU may chose to select another SAC for access or indicate an access failure to a higher layer protocol entity. After the CAU has synchronized to the SAC, the CAU waits for a time alignment channel (TAC) uplink indication. Upon detecting a TAC, the CAU sends a shortened uplink burst (SUB) on the TAC and begins a time alignment response timer and transitions to Alignment state A2. The time alignment response timer sets a limited amount of time for receiving a time alignment message from the CCU before resending an SUB.

In Alignment state A2, the CAU waits for a time alignment message from the CCU. If a collision is detected or the time alignment response timer expires before receiving a time alignment message from the CCU, the CAU adjusts it's transmission power and resends the SUB up to a selected number of times on the SAC. The power adjustment value is a value used to adjust the transmission power of the CAU to a level to achieve an optimal attenuation relative to power level. More detailed information regarding on method of power level control may be found in copending patent application for Method and Apparatus for Adaptive RF Power Control of Cable Access Units, by Timothy M. Burke et al., filed on Oct. 27, 1995, which is incorporated herein. If the number of SUB retries is exceeded, the CAU may select another SAC for access or indicate access failure to a higher layer protocol entity. When the CAU receives a time alignment message from the CCU, the CAU adjusts its transmit offset and waits for a RAC uplink indication. Upon detecting the RAC, the CAU sends an initial access request on the RAC, starts an access response timer, and moves to Access state A3. The access response timer is a timer used to limit the amount of time the CAU waits for a response from the CCU in response to the initial access request.

With reference to Access state A3, the CAU is awaiting for an access confirm or access deny request from the CCU. If the access response timer expires or the CAU receives an access deny request, the CAU will resend the access request message until a number of retries has been exceeded. If the number of retries is exceeded, the CAU sends a message stating the cause for the access failure and moves back to Null state A0. On the other hand, if the CAU receives an access confirm request, the CAU then moves to the assigned traffic channel to perform supervision signaling then moves to traffic channel (TCH) Assigned state A4.

In TCH Assigned state A4, the CAU waits for a normal release of the channel or a dead link indication. If a normal release is received, the CAU moves back to Null state A0. On the other hand, if a dead link indication is detected because of a loss of synchronization or a failed alternate link transfer (ALT), the CAU will perform a reconnect procedure. In particular, the CAU selects a SAC and locates the selected SAC on the appropriate downlink carrier and moves to Sync state A1.

Figure 7:
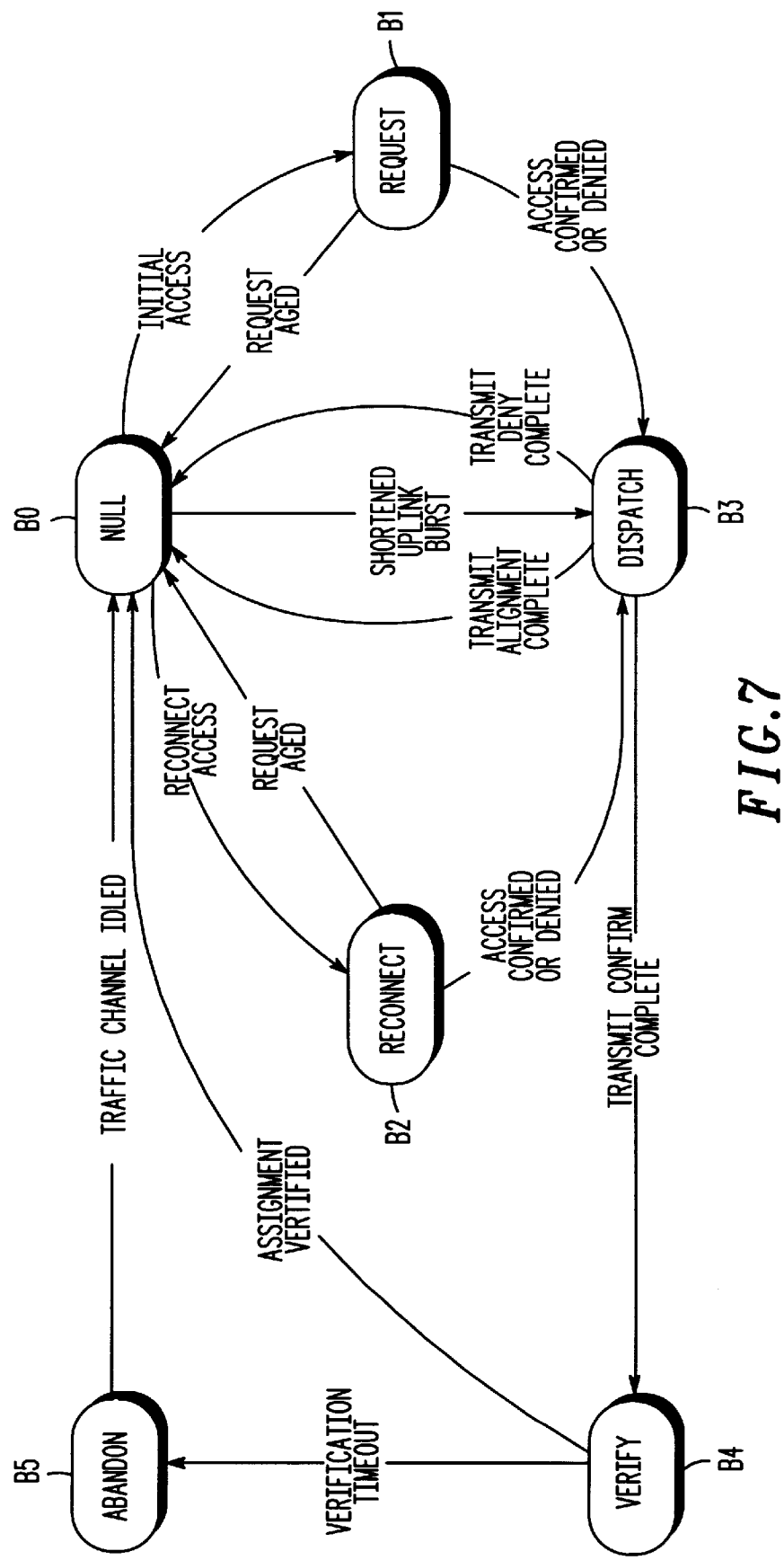
FIG. 7 is a state diagram of a CCU during system access procedures according to the present invention.

With reference now to FIG. 7, a state diagram of a CCU used for system access procedures is depicted according to the present invention. State diagram 700 depicts the different states of the CCU that occur while handling request for access by a CAU. The CCU begins in Null state B0 in which the CCU may have received either an initial access request, a SUB, or a reconnect access message. Reception of an initial access request by the CCU results in the CCU queuing the request with a normal priority and moving to Request state B1. When a reconnect access request is received, the CCU queues the request with a high priority and moves to Reconnect state B2. Reception of a SUB causes the CCU to calculate time alignment and power adjustment information, format a response, and transition to Dispatch state B3.

Turning now to Request state B1, the CCU determines whether has the capability of fulfilling the access request. If CCU can fulfill the request, it waits for an available TCH. Upon a TCH being available for assignment, the CCU checks the age of the request. If the request is greater than a selected period of time, the TCH is assigned to another request and the aged request is removed from the queue and the CCU moves back to Null state B0. If the request is less than the selected amount of time indicated by the CAU in its initial access request as a delay value, the CCU creates an access confirm response and moves to Dispatch state B3.

In Reconnect state B2, the CCU determines whether the call can be reconnected. If the call cannot be reconnected, the CCU creates a deny response and moves to Dispatch state B3. If the CCU can reconnect the call, the CCU waits for an available traffic channel. Upon a TCH becoming available for assignment, the CCU checks the age of the request. If the request is greater than the amount of time indicated by the CAU in its initial access request as a delay value, the request is "aged", and the CCU assigns the traffic channel to another request and removes the aged request from the queue and transitions back to Null state B0. If the request is not aged, and is not greater than the selected amount of time, the CCU creates an access confirm response and moves to Dispatch state B3. In Dispatch state B3, a response is sent once from the CCU to the CAU. After sending a time alignment or access deny response, the CCU moves back to Null state B0. After sending an access confirm response, the CCU begins a verification timer and moves to verify state B4. The verification timer indicates the amount of time the CCU will wait for a first burst from a CAU in a time slot that has been assigned to it and the access confirm response.

In Verify state B4, the verification timer is active and the CCU is waiting for verification that the CAU is transmitting valid uplink burst on the assigned TCH. If the assignment is verified, the CCU moves back to Null state B0. If the verification timer expires, the CCU will initiate procedures to idle the assigned TCH and send an alarm indication and transition to Abandon state B5. The CCU in Abandoned state B5 is idling an assigned TCH. Any uplink bursts received in Abandon state B5 are ignored. When the TCH has been idled, the CCU moves back to Null state B0.

Figure 8:
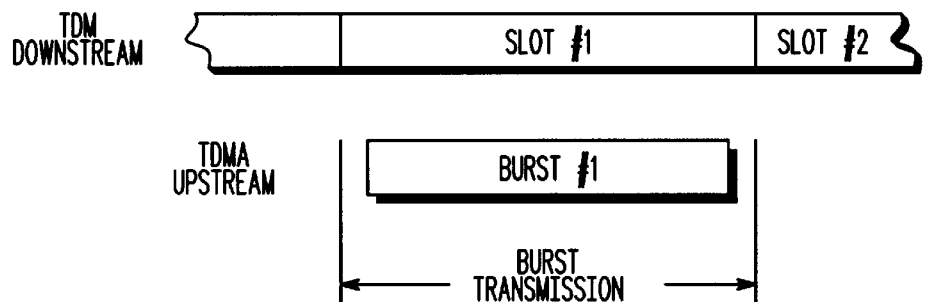
FIG. 8 is a depiction of a burst in the TDMA uplink aligned with a slot in the TDM downlink.

To insure that the communications system using TDMA operates properly, the transmission of bursts from individual CAUs must be aligned within a predefined window, also called a "slot", and cannot overlap adjacent slots, or burst collisions will occur resulting in transmissions errors. As can be seen with reference to FIG. 8, burst 800 in the TDMA uplink is aligned with slot 802 in the TDM downlink. Time alignment is performed by the CAUs by advancing its burst transmission in time relative to the associated received TDMA downlink signal. The CAUs do not know what propagation delays are occurring through the network. Each CAU has a unique delay because of its physical location on the distribution cable. It may be necessary to adjust time alignment because of changes in characteristics of the distribution network and environmental conditions such as temperature.

VII. Flow Diagrams Illustrating Allocation of a Channel to a CAU, and Related Processes The CCU is employed to determine the variable propagation delay by measuring the reception of a shortened burst transmitted from the CAU relative to its processing window. The delay is digitized and conveyed to the CAU in the downlink time slot. A shortened burst from the CAU to the CCU is employed so that any unknown propagation delays do not result in collisions between bursts. Upon receiving the delay compensation number from the CCU, the CAU adjust its burst transmission time for the duration of the call.

Figure 9:
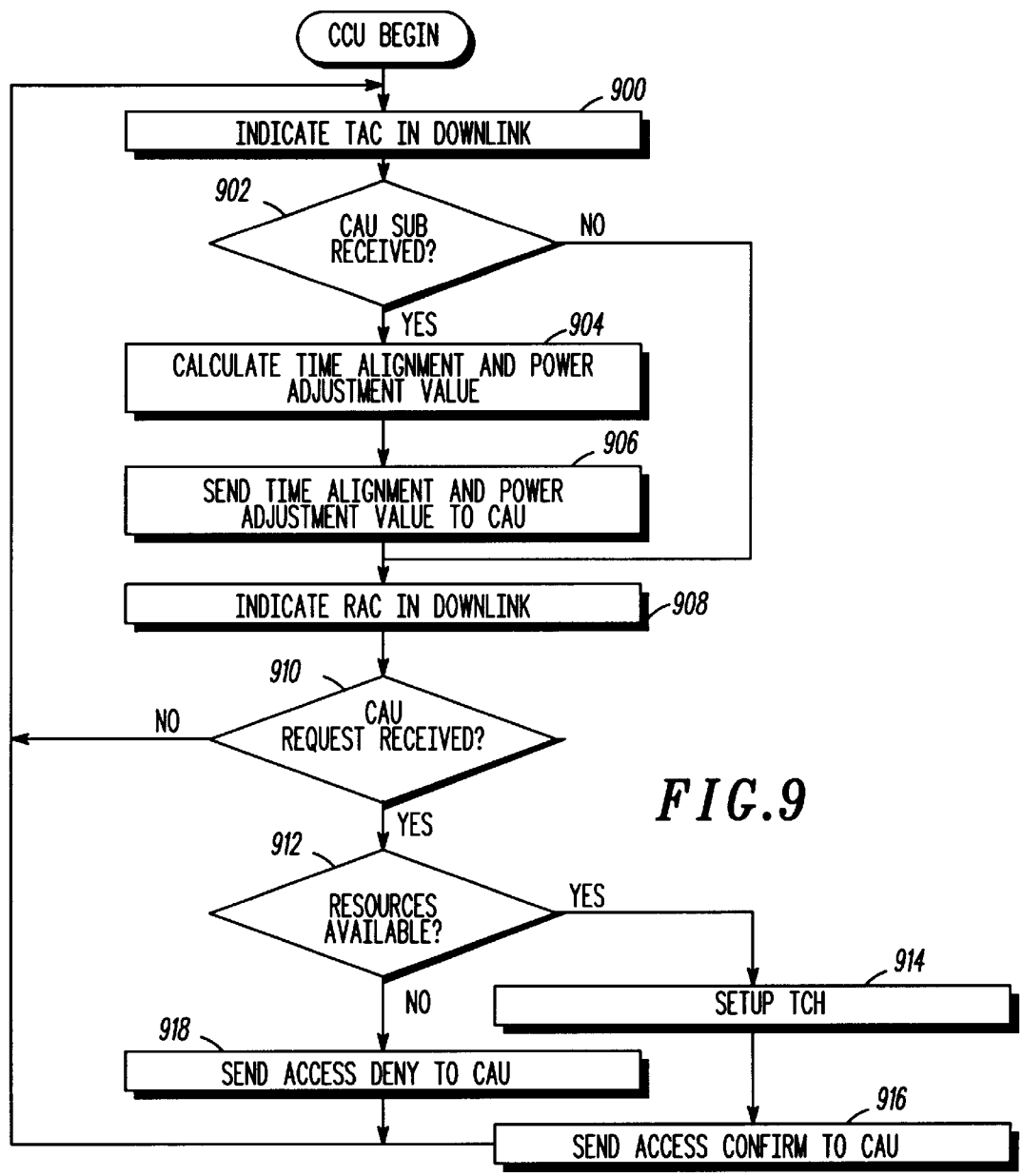
FIG. 9 is a flowchart of a process employed by a CCU during an attempt by a CAU to access the communications system according to the present invention.

With reference now to FIG. 9, a flowchart of a process employed by a CCU during an attempt by a CAU to access a communications system is depicted according to the present invention. The process beings by indicating a TAC in the downlink (step 900). Thereafter, a determination is made as to whether a CAU SUB has been received from a CAU (step 902). If a CAU SUB has been received, a time alignment value and a power adjustment value are determined (step 904).

More specifically, the CCU measures the relative time difference between the start of the received sample window and the position of the shortened burst. This time difference is expressed in bit times and represents the far-end propagation delay. This value is referred to as the time alignment value. The time difference for the time alignment value is measured from the beginning of the transmission of the downlink bursts to the CCU on the TAC to the beginning of the receipt of the uplink bursts, for the same frame number, time slot, and superframe from the CAU. More information on time alignment can be found on co-pending patent application for Method and Apparatus for Synchronizing Timing of Components of a Telecommunication System by Timothy M. Burke et al. filed on Nov. 29, 1995, which is incorporated herein. The time alignment value is sent to the CAU (step 906). Thereafter, the RAC is sent in the downlink (step 908). With reference again to step 902, if a CAU SUB has not been received, the process then proceeds directly to step 908.

A determination is then made as to whether a CAU request has been received (step 910). If a CAU request has not been received, the process then returns to step (900). Otherwise, a determination is then made as to whether TCH resources are available (step 912). If resources are available, then process then sets up a TCH for the CAU (step 914). Thereafter, an access confirm response is sent to the CAU (step 916) with the process then returning to step 900. With reference again to step 912, if resources are not available, an access deny message is sent to the CAU (step 918) with the process then returning to step 900.

Figure 10A:
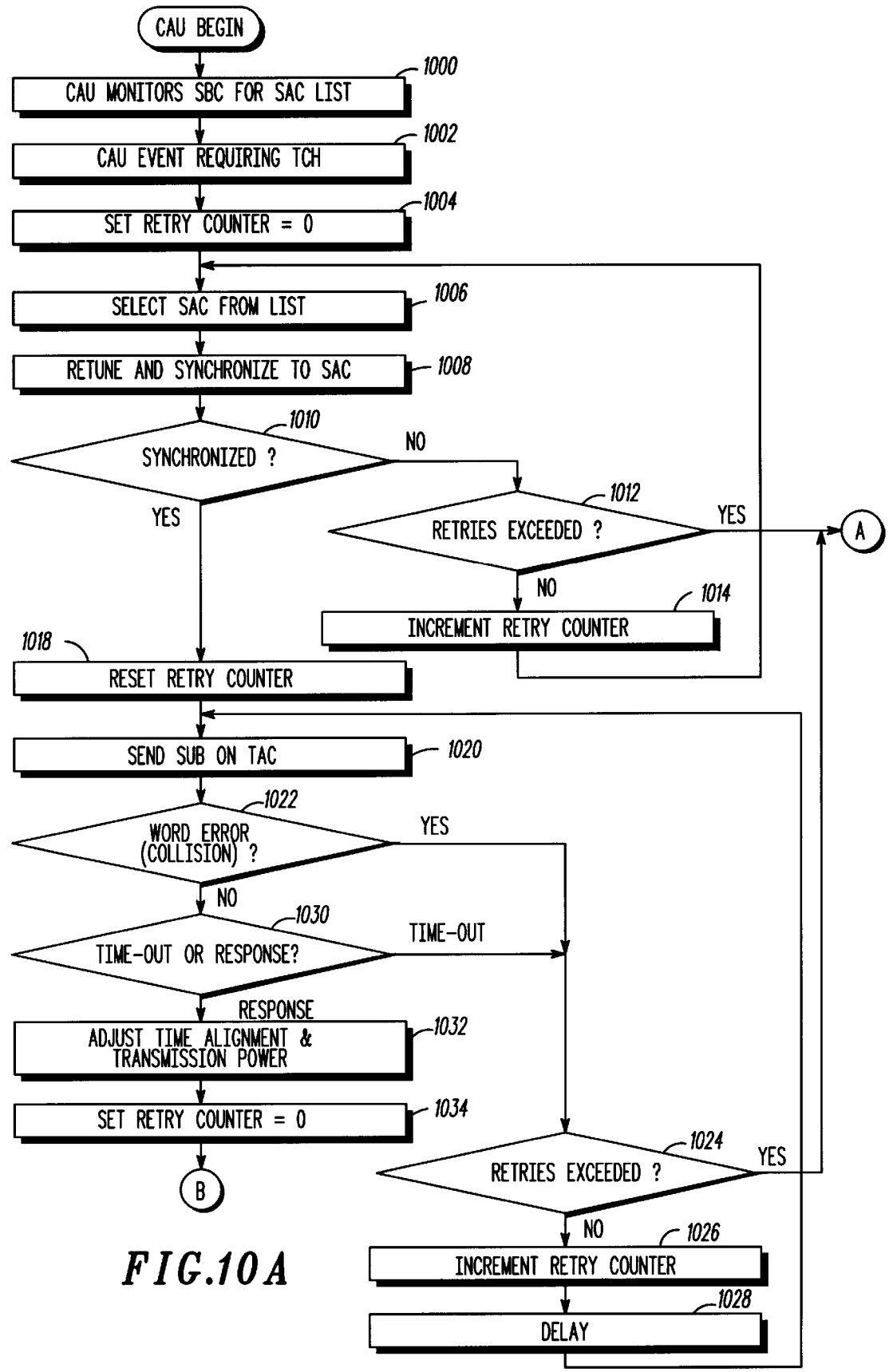
FIG. 10 is a flowchart of a process employed by a CAU to access the communications system according to the present invention.
Figure 10B:
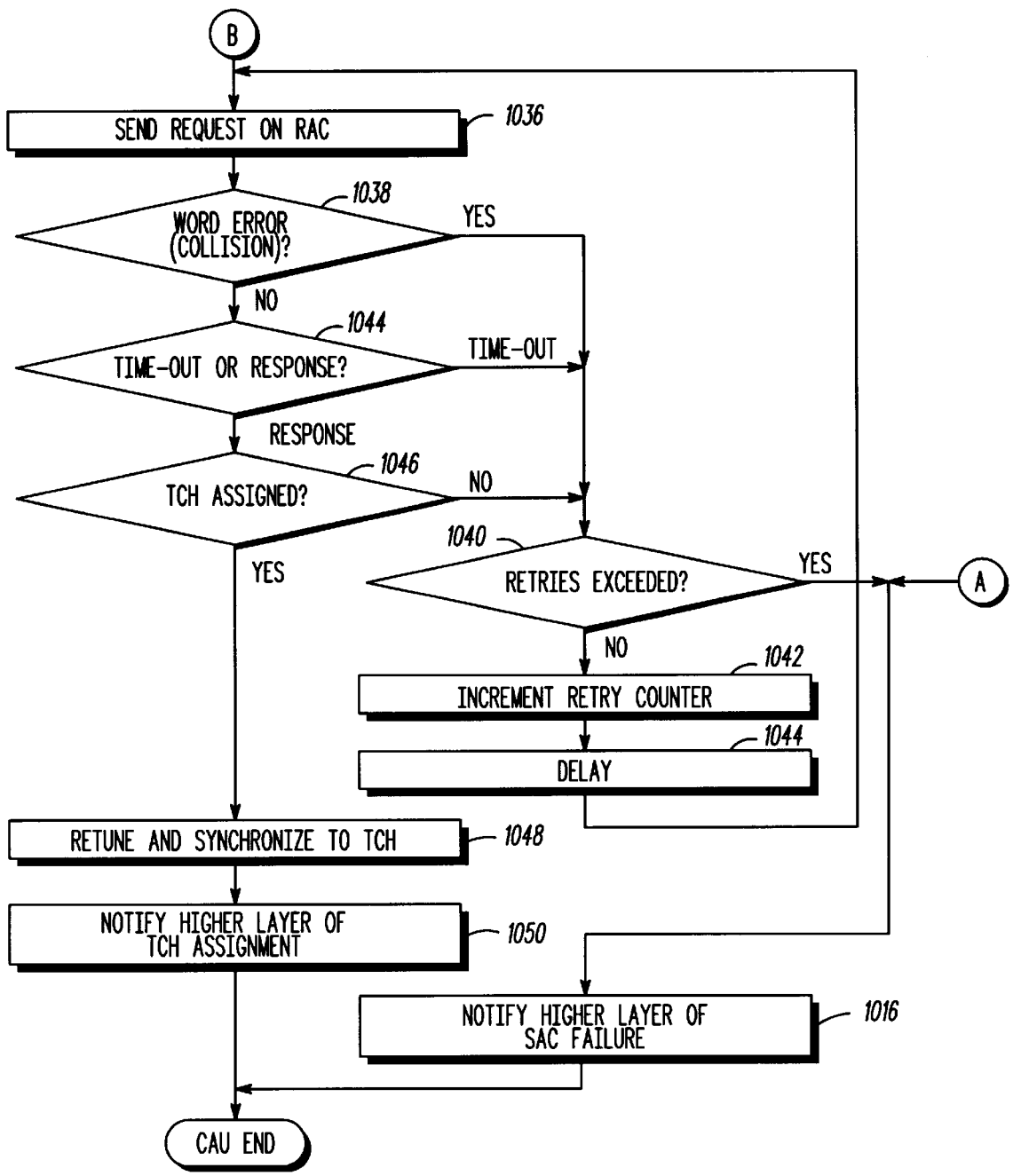

Turning now to FIG. 10, a flowchart of a process employed by a CAU to access a communications system is depicted according to the present invention. The SBC maintains a list of SACs available for system access. This list is broadcast continuously in the SIC. The CAU uses this list to select a SAC and request access to the communications system. The process begins with the CAU monitoring the SBC for a SAC list (step 1000). At (step 1002) a CAU event requiring a TCH (for example, a subscriber takes the phone off the hook) occurs. A retry counter is set equal to zero (step 1004). A SAC is selected from the SAC list (step 1006). The CAU then retunes and synchronizes to the selected SAC (step 1008). A determination is then made as to whether synchronization has been achieved with respect to the selected SAC (step 1010). If synchronization has not occurred, the process then determines whether the number of retries has been exceeded (step 1012). If the number of retires has not been exceeded, the process increments the retry counter by one (step 1014) and the process then returns to step (1006). Otherwise, the process notifies a higher layer in the communications system of the SAC failure (step 1016) with the process terminating thereafter. The communications system includes a group of services arranged in layers similar to the Open Systems Interconnection model.

If synchronization has occurred, the retry counter is set equal to zero (step 1018). Thereafter, SUB is sent on the TAC to the CCU and a time-out timer is started (step 1020). Thereafter, a determination is made of whether a collision has occurred by checking to see if a word error is present in the word error indicator (WEI) (step 1022). According to the present invention, the WEI, an expicit data integrity indicator in the downlink SAC is used to detect a collision between two or more CAUs transmitting in the same time slot. For example, when a CAU sends a burst in time slot 3, frame number 5, then the WEI in time slot 3, frame 5, of the next superframe, will indicate if the burst was received successfully by the CCU. If a collision has occurred, a determination is then made as to whether the number of retries selected for the CAU has been exceeded —(step 1024). If the number of retries has not been exceeded, the retry counter is incremented by one (step 1026).

Thereafter, a delay occurs (step 1028). In the delay (step 1028), a random amount of time is added to the delay timer. The delay for the timer is set as follows:

$$\text{delay} = (\text{random number MOD } (2^N - 1))$$

Also in step 1028, the delay timer is started and the process does not proceed to (step 1020 to send another SUB until after the delay timer expires). Next, the process returns to step 1022 as described above. With reference again to step 1024, if the number of retries has been exceeded, the process then proceeds to notify a higher layer of the SAC failure (step 1016) with the process terminating thereafter. With reference again to step 1022, if a collision has not occurred the process then waits and determines whether a time-out occurs or a response is received (step 1030). If a time-out occurs, the process proceeds to step 1024 as previously described. Otherwise, time alignment and transmission power is adjusted as indicated by the received response (step 1032).

A retry counter is set equal to zero (step 1034). Thereafter, a request for a TCH is sent on the RAC to the CCU and a time-out timer is started (step 1036) and a determination is made as to whether a collision has been indicated in the WEI (step 1038). If a collision has been indicated, as determination is made as to whether the whether the number of retires set for the CAU has been exceeded (step 1040). If the number of retries has not been exceeded, the retry counter is incremented by one (step 1042) and the process then performs a delay, as described above in step 1028, before sending the request again in step 1036.

With reference again to step 1040, if the number of retries has been exceeded, the process then proceeds to step 1016 as previously described. If a collision has not occurred a determination is then made as to whether a time-out has occurred or a response is received (step 1044). If a time-out occurs, the process proceeds to step 1040 as described above. If a response is received, the process then determines whether a TCH has been assigned (step 1046). If a TCH has not been assigned, the process proceeds to step 1040.

Otherwise, the process retunes and synchronizes to the TCH (step 1048) and notifies the higher layer in the communications system of the TCH assignment (step 1050) with the process terminating thereafter.

A WEI is used to detect a degradation in the quality of transmissions between communications units, such as between a CCU and a CAU on TCHs. The WEI bit is set by the CCU to indicate that an error was detected in a previous burst by a failed cyclic redundancy check (CRC). The WEI is set in the same frame number and time slot of the next superframe in the depicted example. In determining whether the burst was received correctly, the CCU determines whether it is able to detect the synchronization pattern within a burst. If the CAU or CCU is unable to detect the synchronization pattern within a burst, a loss of synchronization has occurred and the WEI will indicate that an error has occurred.

According to the present invention, the WEI also is used to detect collisions between multiple CAUs attempting to access the communications system on access channels such as the SACs. Multiple CAUs attempting to transmit bursts in the same time slot and frame of a SAC result in the CCU being unable to detect the synchronization pattern in the bursts received from the CAUs. This inability to detect the synchronization pattern results from two or more CAUs attempting to transmit bursts in the same time slot and frame of an SAC, rather than from a degradation in transmission quality caused by damage to the cable medium or external noise sources. Additionally, a collision may occur when a CRC fails.

Figure 11:
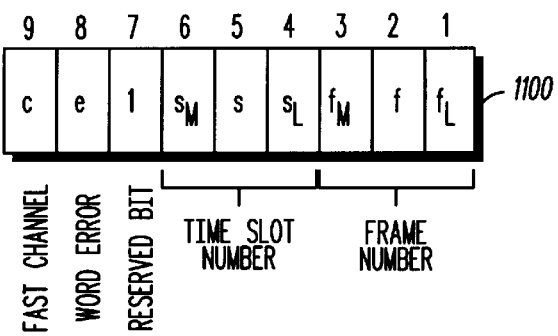
FIG. 11 is a diagram of a burst in a downlink control channel according to the present invention.

With reference now to FIG. 11, a diagram of a burst in a downlink control channel from a CCU to a CAU is depicted according to the present invention. Burst 1100 includes a frame number in bits 1 through 3 the burst as being in that particular one of the 8 sequential frames that constitute a superframe. Frames are marked sequentially from 0 ("000") to 7 ("111") in bits 1 through 3. The value identifies a frame's position within the superframe and is called the frame number. As can be seen, the least significant bit of the frame is transmitted first. Bits 4 through 6 of the control channel mark time slots within a given frame. These time slots are marked sequentially from 0 ("000") to 7 ("111"). The least significant bit is transmitted first. Bit number 7 is reserved for later use according to the present invention. Bit number 8 is the word error indicator and is a "1" when an error has occurred and a "0" when no error has occurred. Bit number 9 in burst 1100 is the fast channel indicator, which indicates whether the fast channel contains signaling information or user information.

Figure 12:
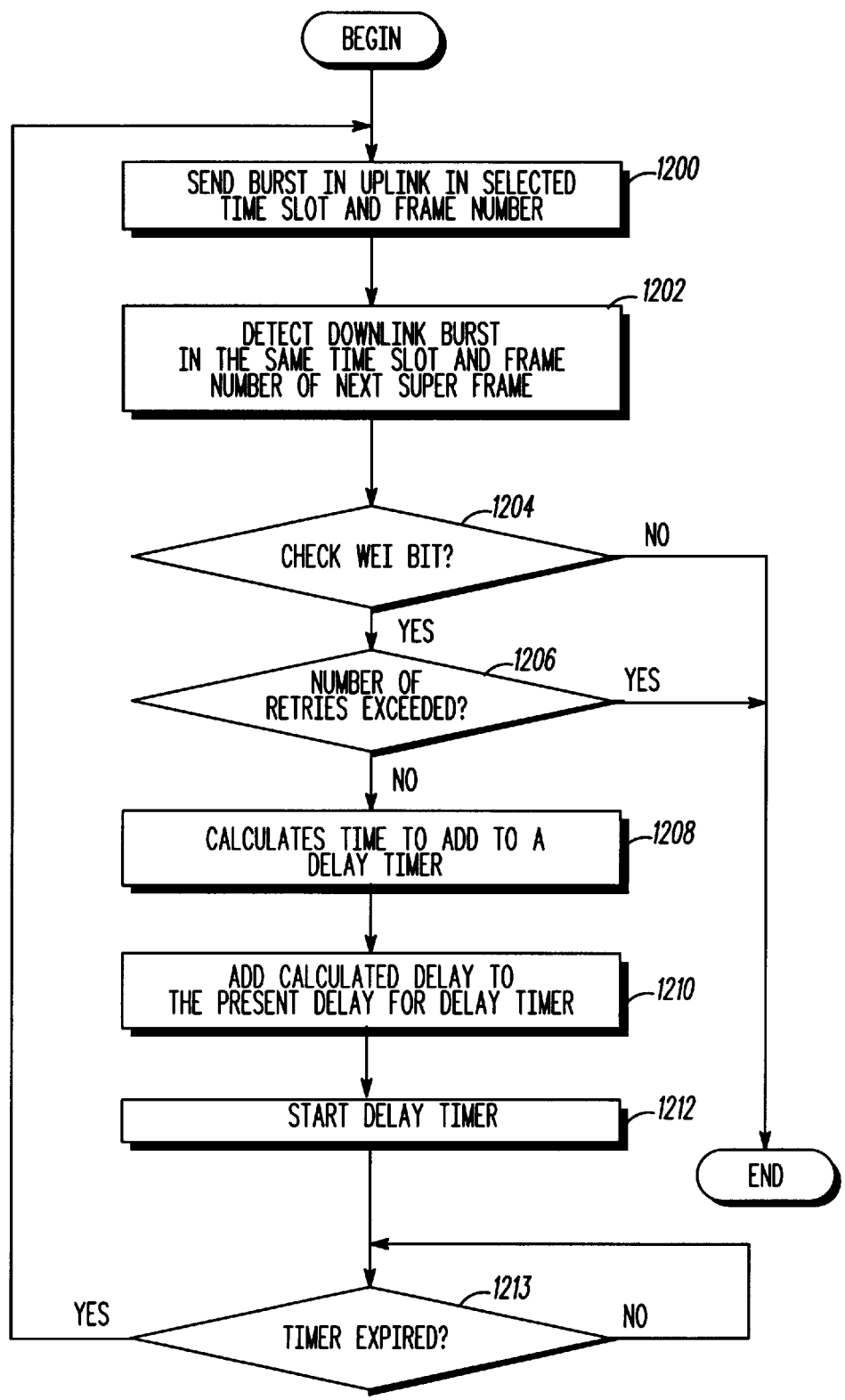
FIG. 12 is a more detailed flowchart of a process for handling collisions between CAUs attempting to access the communications system according to the present invention.

Turning now to FIG. 12, a more detailed flowchart of handling collisions between CAUs is depicted according to the present invention. The process begins by sending a burst in the uplink in a selected time slot and frame number (step 1200). Thereafter, a downlink burst from the CCU is detected in the same time slot and frame number of the next superframe (step 1202). The WEI bit is checked to determine whether a collision has occurred or if the burst was correctly received by the CCU (step 1204). Due to the lag of one superframe, the CAU receives notification of a corrupt burst approximately 20 milliseconds after the burst is sent according to the present invention. If a collision has occurred, the process then determines whether the number of retries has been exceeded (step 1206). If the number of retries has not been exceeded, the process then randomly calculates an amount of time to add to a delay timer (step 1208). The delay for the timer is calculated as follows:

$$\text{delay} = (\text{random number MOD } (2^N - 1))$$

The calculated delay is then added to the present delay for the delay timer (step 1210). The delay timer is started (step 1212) with the process returning to step 1200 to send another burst to the CCU after the delay timer has expired (step 1213). With reference again to step 1206, if the number of retries has been exceeded, the process then terminates. Additionally, the process terminates if a collision does not occur in step 1204.

Figure 13:
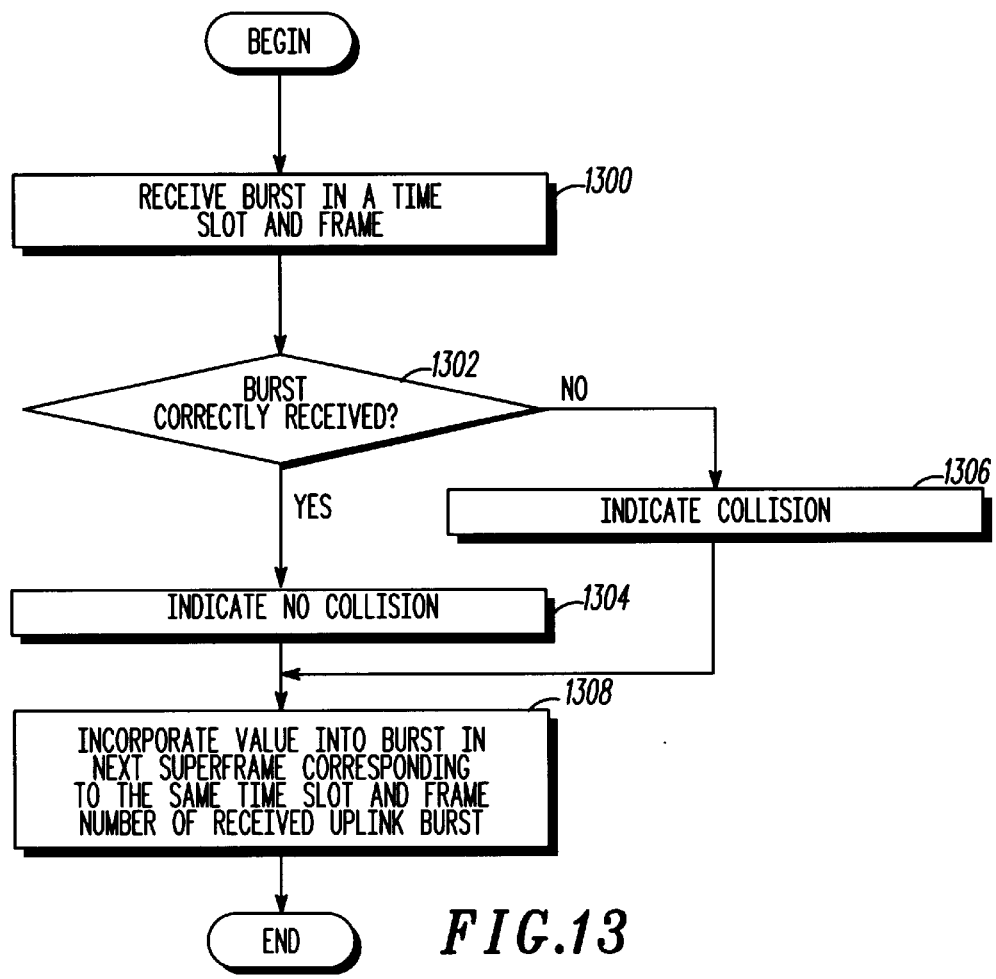
FIG. 13 is a flowchart of process followed by a CCU for setting a word error indicator (WEI) bit in response to a collisions between CAU bursts sent to the CCU according to the present invention.

With reference now to FIG. 13, a process followed by a CCU for setting a WEI bit in response to a collisions between CAU bursts sent to the CCU is depicted according to the present invention. The process begins by receiving a burst in a given time slot and frame of the uplink at a CPX in the CCU (step 1300). Thereafter, a determination is made as to whether the burst has been correctly received (step 1302). In determining whether the burst was received correctly, the CCU determines whether it is able to detect the synchronization pattern within a burst or if a failed CRC is present. If the burst has been correctly received, the process sets the WEI bit to indicate that no collision has occurred (step 1304). Otherwise, the process sets the bit to indicate a collision has occurred (step 1306). In either case, the value for the WEI bit is incorporated into the burst in the next superframe corresponding to the same time slot and frame number of the received uplink burst (step 1308) with the process terminating thereafter.

Figure 14:
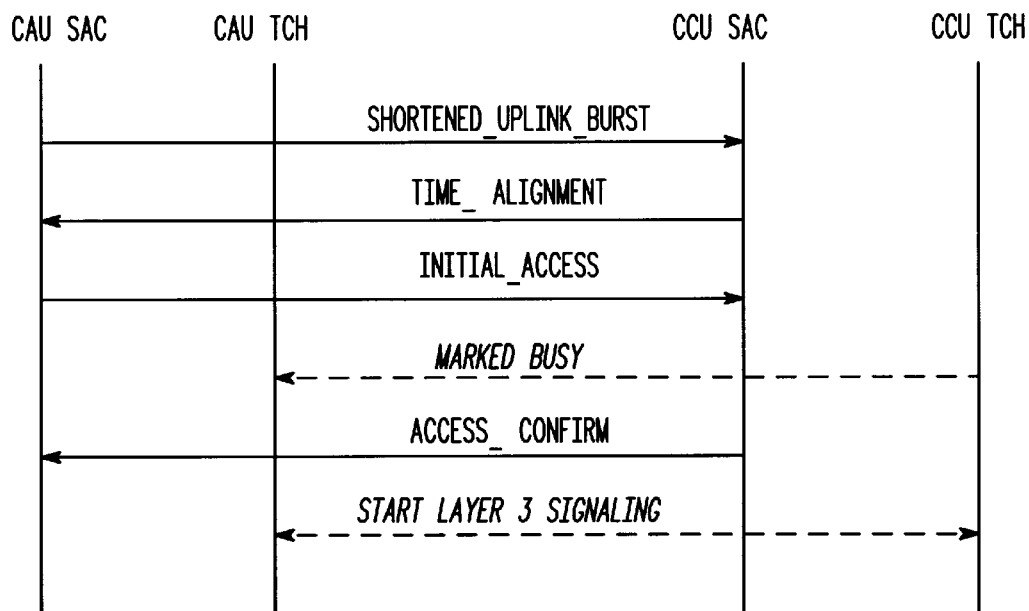
FIG. 14 illustrates the signaling between the CAU and the CCU over system access channels (SAC) in which access is confirmed.

VIII. Signal Sequences Used in Providing Channel Access and Resolving Channel Contention FIG. 14 illustrates the signaling between the CAU and the CCU over channels SAC and TCH in which access is confirmed.

A SUB is sent from the CAU to the CCU on the SAC with the CCU sending a time alignment signal back to the CAU. Thereafter, the CAU sends an initial access request on the RAC.

Each access request received by the CCU is queued. The CCU saves the information sent in the uplink transmission from the CAU plus the channel address (carrier and time slot) on which the system access was received. Thereafter, the CCU will transmit either a successful response or a unsuccessful response on the downlink of the SAC on which it received the request.

Figure 15:
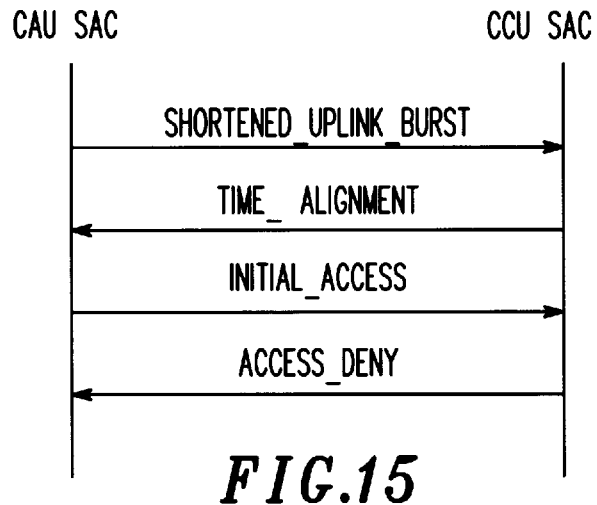
FIG. 15 shows signaling between the CAU and the CCU on the SAC in which access is denied.

FIG. 15 shows signaling between the CAU and the CCU on the SAC in which access is denied. The CAU sends a shortened uplink burst to the CCU with the CCU responding with a time alignment response. Thereafter, the CAU sends an initial access request to the CCU as in FIG. 14, in this case, however, the CCU replies with an access deny response. Upon denial of access, the CAU may either retransmit the request for initial access or report that the maximum number of retry attempts have been exceeded.

A channel refers to the carrier and time slot or slots assigned to a CAU in an access confirm message. Channels are assigned and/or allocated according to the following rules:

1. Time slots on the same carrier as the SBCs and the SACs will be assigned first. The CCU will always try to locate these channels on good carriers. Furthermore, the system will be able to derive problems with SBCs and SACs based on ALT requests from other channels on the same carrier.
2. The available time slots on a carrier will be assigned before moving onto another carrier. The CCU will pack carriers to improve the efficiency and probability of carrier link transfers.
3. When a CCU starts assigning time slots on a new carrier, it will select the carrier with the best quality metrics.

Once a channel has been assigned, the CAU will return to the assigned carrier, and the CAU will use the assigned time slot(s) to perform the call supervision messaging for establishing a call, or connection. Channel assignments will be granted to the top entry of a priority queue.

Figure 16:
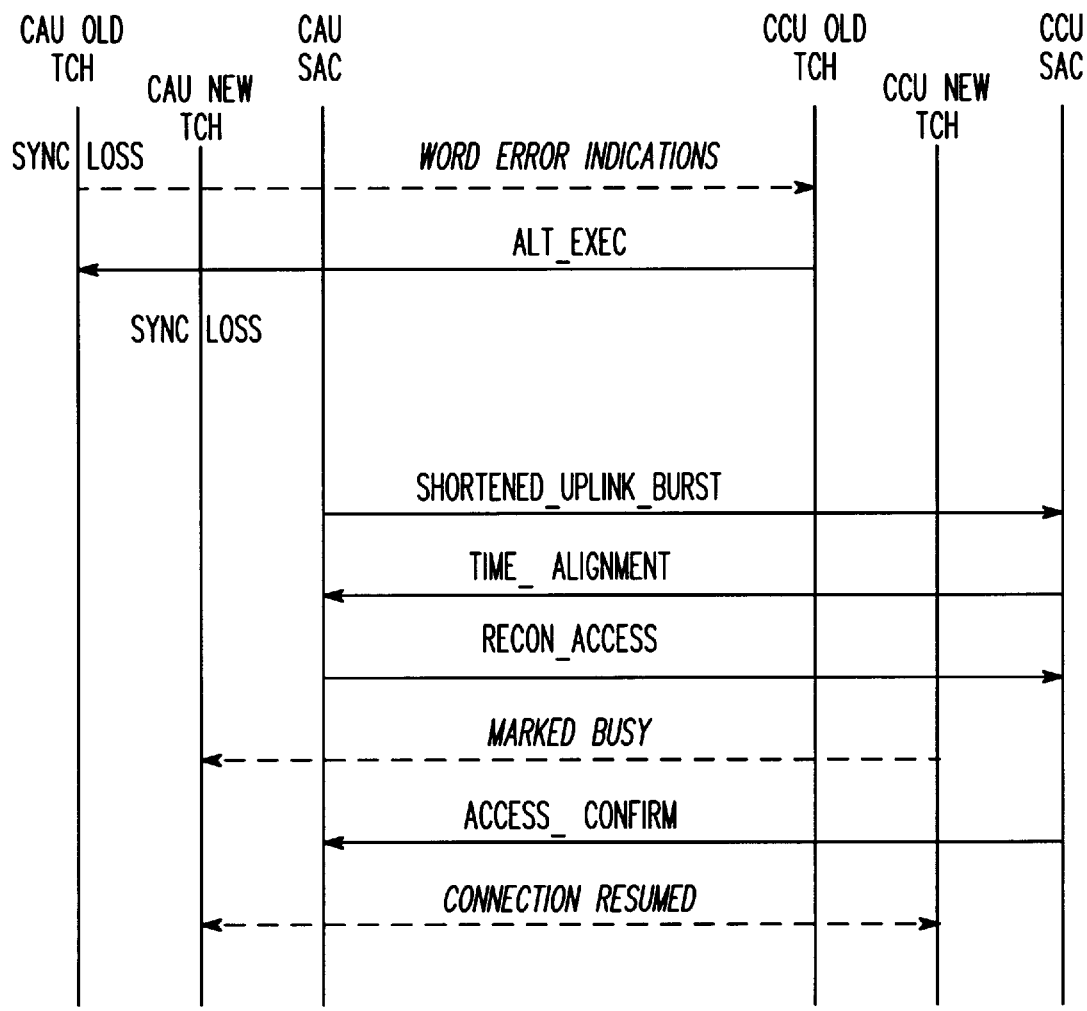
FIG. 16 is an illustration of signals between a CAU and a CCU resulting in a successful reconnect access request.

Each serving area will be associated with a single priority queue for system access requests. Often times errors can occur during transmission of data in which the CAU will try to reconnect to a new carrier from the effected carrier. This transfer of carriers occurs when a CAU experiences loss of synchronization on a downlink carrier. This loss of synchronization is typically reported as a word error indication on the uplink carrier to the CCU. Upon receipt of the word error indication, the CCU performs a downlink transfer from the affected carrier to a new carrier. FIG. 16 is an illustration of signals between a CAU and a CCU resulting in a successful reconnect access request. The CCU will suspend the data link and encipherment (if active) when a command to execute an alternate link transfer (ALT), ALT_EXEC, is sent, whether the CAU sees the ALT_EXEC or not. An ALT is a procedure used to maintain a connection between communications units while a call is in progress in spite of changing frequencies of a channel. When the reconnect request, RECON_ACCESS, is received, the CCU will effectively assign the CAU to same CPX, which will be transmitting the new downlink carrier. Upon assignment of the new channel, the CCU will transmit a busy pattern in the slow channel of the new link, and send an access confirm response to the CAU identifying the new channel. The CAU will retune to the new traffic channel, and resume the data link. The same initial access protocol timers and parameters will apply to the reconnect access procedure.

Figure 17:
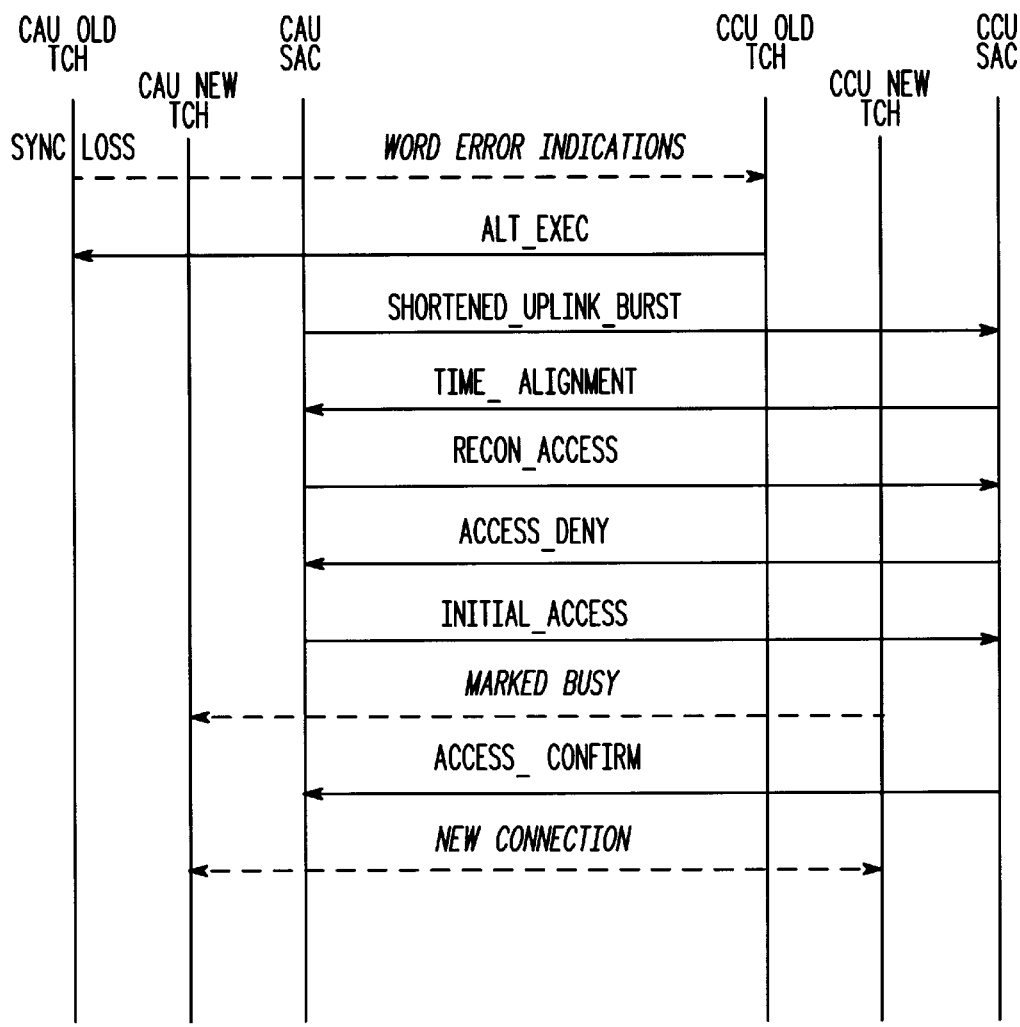
FIG. 17 is a diagram of signals between a CAU and a CCU resulting in a failed reconnect access request.

With reference now to FIG. 17, a diagram of signals between a CAU and a CCU resulting in a failed reconnect access request is illustrated. This scenario occurs when the CCU is unable to reconnect the CAU. Therefore, when the CAU receives an access deny response in response to it's reconnect access request, RECON_ACCESS, the CAU will send an initial access request to get a new TCH assigned. If the reconnect access request was for multiple connections, then separate initial access requests will need to be sent for each connection. The impact on the customer is that their original call may have been disconnected, in which case, dial tone would be provided to the customer when a new connection is established.

Figure 18:
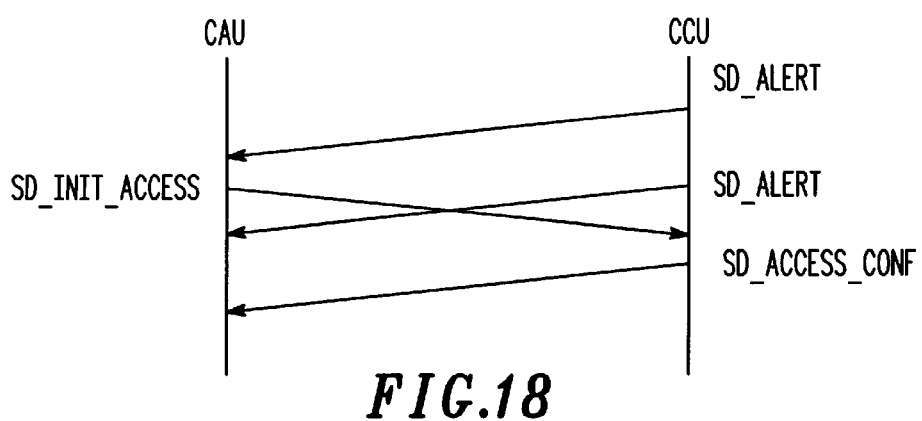
FIG. 18 is an illustration of signals used for requesting access for an additional call on slow channel.

Additionally, in some instances a CAU may use multi-line access to the communications system. A multi-line CAU may use a TCH, of an active call it controls, to request access for an additional call. No contention exists for the TCH already being used by the requesting CAU. As a result, no contention is present for this channel and no SUB is necessary because time alignment already has been performed. Thus, only an initial access, an access confirm and access deny messages need to be sent on the active traffic channel. These are sent on the slow channel portion of the time slot. FIG. 18 depicts a procedure used for requesting access for an additional call on the slow channel. As can be seen with reference to FIG. 18, the access procedure is initiated by the CCU. If a CAU with multiple active traffic channels loses synchronization, then a signal reconnect procedure will be performed from all of the active traffic channels on the CAU. The traffic channel assignments in the access confirm response will correspond, one-to-one, to the traffic channels specified in the reconnect access request. If an access deny response is received in response to the reconnect access request for multiple traffic channels, the CAU will send individual initial access requests for each of the traffic channels.

The process depicted in FIGS. 6–7 and 9–19 may be implemented by those of ordinary skill in the art within the hardware illustrated in FIGS. 1, 2 and 3. The processes of the present invention also may be implemented in a program storage device that is readable by processors within the hardware depicted above, wherein the program storage device encodes executable instructions of the processes of the present invention. The program storage device may take various forms including, for example, but not limited to a hard disk drive, an optical disk, a ROM, an EPROM, or a RAM, which are know to those skilled in the art.

The process stored on a program storage device are dormant until activated by using the program storage device with a processor, such as a microprocessor or a DSP. For example, the processes for providing access to the communications system may be coded as instructions stored on a hard disk drive or an optical disk. Connecting the hard disk drive or the optical disk to the processor in the CCU allows the processor to execute these instructions and control access to the communications system. Additionally, the processes used in handling contention between CAUs for the same time slots may be implemented in a ROM in which the processes become active when the ROM is connected to the CAU.

The present invention provides an improved communications system by providing a separate set of channels used for accessing the communications system. These SACs are separate from the TCHs used for user information, such as a digital voice data. These SACs may move frequencies depending on the quality of transmissions. The SBCs provide a list of the SACs and their locations for access to the communications system. Upon receiving a request for a TCH on a SAC, the CCU assigns a traffic channel to the requesting CAU depending on available resources. This assignment is sent to the CAU on the downlink SAC. Additionally, the present invention provides a method for CAUs to detect and resolve collisions between multiple CAUs attempting to transmit burst on the same time slot. As a result, the methods and apparatus of the presently claimed invention provide for an improved system to access a communications system.

While the invention has been particularly shown and described with reference to a preferred embodiment, it will be understood by those skilled in the art that various changes in form and detail may be made therein without departing from the spirit and scope of the invention.

What is claimed is:

1. A method for resolving data transmission collisions within a communications system comprising the steps of:

sending a first data transmission from a communications unit to a base communications unit on an uplink channel used for accessing the communications system, wherein the first data transmission includes a synchronization pattern;

monitoring a downlink channel for an explicit data integrity response from the base communications unit, wherein the response is associated with the first data transmission;

determining whether a collision has occurred between the first data transmission and a second data transmission from another communications unit by examining the explicit data integrity response, wherein the explicit data integrity response indicates that a collision has occurred during the first data transmission to the base communication unit when the base communications unit is unable to detect the synchronization pattern; and automatically retransmitting the first data transmission after a random period of time in response to a determination that a collision has occurred.

2. The method of claim 1, wherein the sending step comprises sending a burst from the communications unit to the base communications unit in a time slot in a frame located in a superframe, the burst including the synchronization pattern.

3. The method of claim 2, wherein the monitoring step comprises monitoring a response from the base communications unit, the response being located in a corresponding time slot and frame within a subsequent superframe.

4. The method of claim 3, wherein the response includes a word error indicator and wherein the determining step comprises determining whether the word error indicator indicates that the base communications unit was unable to detect the synchronization pattern in the burst from the communications unit.

5. The method of claim 4, further comprising selecting the random period of time in response to a determination that an error has occurred from the examination of the response, wherein the automatically retransmitting step occurs in a different time slot.

6. A communication system comprising:
   a cable distribution network;
   a base communications unit connected to the cable distribution network, the base communications unit generating downlink data transmissions and receiving uplink data transmissions;
   a plurality of subscriber communications units connected to the cable distribution network, the plurality of subscriber communications units sending uplink data transmissions to the base communications unit in the cable distribution system to request access to the communications system, wherein uplink data transmissions from a subscriber communications unit within the plurality of subscriber communications unit are associated with downlink transmissions from the base communications unit to the subscriber communications unit and wherein each uplink data transmission and each downlink data transmission includes a synchronization pattern;
   the base communications unit monitoring uplink data transmissions from the plurality of subscriber communications units and transmitting and associated downlink data transmission in response to each uplink data transmission, each downlink data transmission including an explicit data integrity indicator indicating whether the base communications unit is able to successfully receive the uplink data transmission; and
   a subscriber communications unit within the plurality of subscriber communications units resending an uplink data transmission after a random period of time in response to receiving an associated downlink data transmission from the base communications unit in which the explicit data integrity indicator in the downlink data transmission indicates an inability to successfully receive the uplink data transmission because a collision has occurred between the subscriber communications unit and another subscriber communications unit in the plurality of subscriber communications units.

7. The communications system of claim 6, wherein an uplink data transmission from a subscriber communications unit to the base communications unit is sent in a time slot within a frame, the frame being located within a superframe, and wherein an uplink data transmission from the subscriber communications unit to the base communications unit is associated with a downlink data transmission from the base communications unit to the subscriber communications unit by sending a downlink data transmission in corresponding time slot and frame in a subsequent superframe.

8. The communications system of claim 7, wherein each subscriber communications unit comprises:
   sending means for sending a first uplink data transmission from the subscriber communications unit to the base communications unit;
   reception means for receiving an associated downlink data transmission from the base communications unit;
   determination means for determining whether a collision has occurred between the first uplink data transmission and another uplink data transmission from another communications unit by examining the error indicator in the associated downlink data transmission; and
   transmission means for automatically retransmitting the first data transmission after a random period of time in response to a determination that an error has occurred from the examination of the error indicator.

9. A subscriber communications unit comprising:
   an interface adapted for connection to a cable distribution network in a communications system; and
   a processor connected to the interface in which the processor has a number of modes of operation including:
   a first mode of operation in which the processor sends a first uplink data transmission from the subscriber communications unit to a base communications unit, the first uplink data transmission being sent in a time slot in a frame within a superframe;
   a second mode of operation in which the processor receives an associated downlink data transmission associated with the first uplink data transmission, wherein the associated downlink data transmission associated with the first uplink data transmission, wherein the associated downlink data transmission is associated with the first uplink data transmission by being received in a corresponding time slot and frame in a subsequent superframe;
   a third mode of operation in which the processor determines whether a collision has occurred between the first uplink data transmission from the subscriber communications unit and another uplink data transmission from another communications unit by examining the explicit data integrity indicator in the associated downlink data transmission to the subscriber communications unit; and
   a fourth mode of operation in which the processor automatically retransmits the first uplink data transmission after a random period of time in response to a determination that an error has occurred.

10. The subscriber communications unit of claim 9, wherein the first uplink data transmission is a shortened uplink burst including three copies of the synchronization pattern.

11. The subscriber communications unit of claim 9, wherein the first data transmission requests access to the communications system.

12. The subscriber communications unit of claim 9, wherein the first uplink data transmission is sent to the base communications unit in a time slot within a frame, the frame being located within a superframe, and wherein the associated downlink transmission is returned in a corresponding time slot and frame in a subsequent superframe.

13. A storage device readable by a processor in a communications unit and encoding processor executable instructions for handling data collisions, the storage device comprising:

first instruction means for sending a first uplink data transmission from the subscriber communications unit to a base communications unit, wherein the first uplink data transmission requests access to the communications system;

second instruction means for sending a first uplink data transmission from the base communications unit;

third instruction means for determining whether a collision has occurred between the first uplink data transmission from the subscriber communications unit and another uplink data transmission from another communications unit by examining an explicit data integrity error indicator in the associated downlink data transmission; and fourth instruction means for automatically retransmitting the first data transmission after a random period of time in response to a determination that an explicit data integrity error has occurred, wherein the instruction means are activated when the storage device is connected to a processor.

14. The storage device of claim 13, wherein the storage device is a read only memory.

15. The storage device of claim 13, wherein the storage device is a random access memory.

16. A communications unit for use in a cable communications system comprising:

an interface adapted for connection to a distribution network in the cable communications system, the interface providing a connection for sending and receiving data transmissions on the distribution network, wherein data transmissions are transmitted on a plurality of channels, each channel being assigned a portion of a radio frequency spectrum, in which the portion of the radio frequency spectrum is divided by time into a plurality of time slots; and:

a receiver connected to the interface, wherein the receiver receives modulated data signals from the interface and converts the modulated data signals into digital data;

a transmitter connected to the interface, wherein the transmitter converts digital data into modulated data signals for transmission onto the communications system;

a processing unit connected to the transmitter and the receiver;

a subscriber loop interface adapted to be connected to user equipment; and a pulse code modulated coder/decoder unit connected to the transmitter, the processing unit, and the subscriber loop interface, wherein digital data containing user data is converted into an analog form for use by a user and wherein analog data from a user is converted into a digital form, wherein the processor sends a first uplink burst to a cable control unit, wherein the first uplink burst is made within a time slot within a frame located within a superframe and the first data transmission includes a synchronization pattern; receives an associated downlink burst from the cable control unit, wherein the associated downlink burst is within a corresponding time slot and frame in a subsequent superframe; determines whether a collision has occurred between the first uplink burst from the processor and another uplink burst from another communications unit by examining an explicit data integrity indicator in the associated downlink burst, wherein the explicit data integrity indicator indicates a collision when the cable control unit is unable to recognize the synchronization pattern; and retransmits the first uplink burst after a random period of time in response to a determination that an collision has occurred.

17. An apparatus for use in a cable communications system comprising:

an interface adapted for connection to a distribution network in the cable communications system, the interface providing a connection for sending and receiving data transmissions on the distribution network, wherein data transmissions are transmitted on a plurality of channels, each channel being assigned a portion of a radio frequency spectrum, in which the portion of the radio frequency spectrum is divided by time into a plurality of time slots; and a processing unit including:

first processing means for sending a first uplink data transmission to a base communications unit, wherein the first data transmission is made within a time slot in a frame located within a superframe and the first uplink data transmission includes a synchronization pattern;

second processing means for receiving an associated downlink data transmission from the base communications unit, wherein the associated downlink transmission is within a corresponding time slot and frame in a subsequent superframe;

third processing means for determining whether a collision has occurred between the first uplink data transmission from the processing unit and another uplink data transmission from another communications unit by examining an explicit data integrity indicator in the associated downlink transmission, wherein the explicit data integrity indicator indicates a collision when the base communications unit is unable to successfully receive the first uplink data transmission; and fourth processing means for retransmitting the first uplink data transmission by the processing unit after a random period of time in response to a determination that a collision has occurred.

18. The apparatus of claim 17, wherein the error indicator indicates a collision when the base communications unit is unable to successfully receive the first uplink data transmission because the base communications unit is unable to recognize the synchronization pattern.

19. The apparatus of claim 17, wherein the error indicator indicates a collision when the base communications unit is unable to successfully receive the first uplink data transmission because a cyclic redundancy check has failed.

20. The apparatus of claim 17, wherein the processing unit comprises a microprocessor and a random access memory.

21. The apparatus of claim 17, wherein the first uplink data transmission is a shortened uplink burst.

22. The apparatus of claim 17, wherein the first data transmission is a shortened uplink burst including three copies of the synchronization pattern.

23. The apparatus of claim 17, wherein the first uplink data transmission is a request for access to the cable communications system.

24. A communications unit for use in a cable communications system comprising:

an interface adapted for connection to a distribution network in the cable communications system, the interface providing a connection for sending and receiving data transmissions on the distribution network, wherein data transmissions are transmitted on a plurality of channels, each channel being assigned a portion of a radio frequency spectrum, in which the portion of the radio frequency spectrum is divided by time into a plurality of time slots; and a processing unit having a plurality of modes of operating including:

a first mode of operation in which the processor sends a first uplink data transmission to a base communications unit, wherein the first uplink data transmission is made within a time slot within a frame located within a superframe and the first uplink data transmission includes a synchronization pattern;

a second mode of operation in which the processor receives an associated downlink data transmission from the base communications unit, wherein the associated downlink data transmission is within a corresponding time slot and frame in a subsequent superframe;

a third mode of operation in which the processor determines whether a collision has occurred between the first uplink data transmission of the communications unit and another uplink data transmission from another communications unit by examining an explicit data integrity indicator in the associated downlink transmission, wherein the explicit data integrity indicator indicates a collision when the base communications unit is unable to recognize the synchronization pattern; and a fourth mode of operation in which a processor retransmits the first data transmission after a random period of time in response to a determination that a collision has occurred.

25. The communications unit of claim 24, wherein the error indicator indicates a collision when the base communications unit is unable to successfully receive the first uplink data transmission because the base communications unit is unable to recognize the synchronization pattern.

26. The communications unit of claim 24, wherein the error indicator indicates a collision when the base communications unit is unable to successfully receive the first uplink data transmission because a cyclic redundancy check has failed.

27. The communications unit of claim 24, wherein the processing unit comprises a microprocessor and a random access memory.

28. The communications unit of claim 27, wherein the processing unit further includes a read only memory.

29. The communications unit of claim 24, wherein the first uplink data transmission is a shortened uplink burst.

30. The communications of claim 24, wherein the first uplink data transmission is a request for access to the cable communications system.

* * * * *